(12) United States Patent
Monobe et al.

(10) Patent No.: US 9,068,831 B2
(45) Date of Patent: Jun. 30, 2015

(54) IMAGE PROCESSING APPARATUS AND IMAGE PROCESSING METHOD

(75) Inventors: Yusuke Monobe, Kyoto (JP); Hitoshi Yamada, Osaka (JP)

(73) Assignee: PANASONIC INTELLECTUAL PROPERTY MANAGEMENT CO., LTD., Osaka (JP)

(\*) Notice: Subject to any disclaimer, the term of this patent is extended or adjusted under 35 U.S.C. 154(b) by 116 days.

(21) Appl. No.: 13/812,038

(22) PCT Filed: May 24, 2012

(86) PCT No.: PCT/JP2012/003398
§ 371 (c)(1),
(2), (4) Date: Jan. 24, 2013

(87) PCT Pub. No.: WO2012/164881
PCT Pub. Date: Dec. 6, 2012

(65) Prior Publication Data
US 2013/0121537 A1   May 16, 2013

(30) Foreign Application Priority Data
May 27, 2011   (JP) .................................. 2011-119049

(51) Int. Cl.
*G06K 9/00*   (2006.01)
*G01C 11/06*   (2006.01)
(Continued)

(52) U.S. Cl.
CPC ............ *G01C 11/06* (2013.01); *H04N 5/23254* (2013.01); *H04N 5/23267* (2013.01); *H04N 5/2355* (2013.01); *G01C 3/32* (2013.01); *G06T 5/003* (2013.01); *G06T 5/50* (2013.01);
(Continued)

(58) Field of Classification Search
None
See application file for complete search history.

(56) References Cited

U.S. PATENT DOCUMENTS 4,065,778 A * 12/1977 Harvey .......................... 396/101
4,792,694 A * 12/1988 Shioya et al. .................. 250/558
(Continued)

FOREIGN PATENT DOCUMENTS

| JP | 2000-50173 | 2/2000 |
| JP | 2002-259987 | 9/2002 |

(Continued)

OTHER PUBLICATIONS

International Search Report issued Jul. 17, 2012 in corresponding International Application No. PCT/JP2012/003398.
(Continued)

*Primary Examiner* — Tsung-Yin Tsai
(74) *Attorney, Agent, or Firm* — Wenderoth, Lind & Ponack, L.L.P.

(57) ABSTRACT

An image processing apparatus measures a subject distance using a plurality of captured images acquired by capturing the same subject in a plurality of imaging states in succession of time. The image processing apparatus includes a target motion amount estimation unit that estimates a target motion amount representing an amount of shift in subject position between first and second images among the captured images. The first image is captured in a first imaging state and a second image is captured in a second imaging state different from the first imaging state. A corrected image generation unit generates a corrected image by performing motion compensation on the second image based on the target motion amount, and an image processing unit performs image processing such as measuring a subject distance or generating an HDR image, using the first image and the corrected image.

9 Claims, 19 Drawing Sheets

(51) Int. Cl.
- *H04N 5/232* (2006.01)
- *H04N 5/235* (2006.01)
- *G01C 3/32* (2006.01)
- *G06T 5/00* (2006.01)
- *G06T 5/50* (2006.01)
- *G06T 7/20* (2006.01)
- *G02B 7/38* (2006.01)

(52) U.S. Cl.
CPC ......... *G06T7/20* (2013.01); *G06T 2207/20201* (2013.01); *G02B 7/38* (2013.01)

(56) References Cited

U.S. PATENT DOCUMENTS

| | | | | |
|---|---|---|---|---|
| 5,148,502 | A * | 9/1992 | Tsujiuchi et al. | 382/255 |
| 5,502,537 | A * | 3/1996 | Utagawa | 396/95 |
| 5,539,493 | A * | 7/1996 | Kusaka | 396/96 |
| 5,892,578 | A * | 4/1999 | Suda | 356/123 |
| 6,072,525 | A * | 6/2000 | Kaneda | 348/208.15 |
| 6,229,568 | B1 * | 5/2001 | Kawaguchi et al. | 348/350 |
| 6,801,248 | B1 | 10/2004 | Horiuchi | |
| 7,224,397 | B2 * | 5/2007 | Sasaki | 348/348 |
| 7,372,487 | B2 | 5/2008 | Horiuchi | |
| 7,405,762 | B2 * | 7/2008 | Nonaka et al. | 348/348 |
| 7,538,813 | B2 * | 5/2009 | Wernersson | 348/345 |
| 8,792,048 | B2 * | 7/2014 | Takeuchi | 348/350 |
| 2002/0154240 | A1 | 10/2002 | Tamai et al. | |
| 2003/0043290 | A1 * | 3/2003 | Sasaki | 348/345 |
| 2004/0201759 | A1 | 10/2004 | Horiuchi | |
| 2006/0256229 | A1 * | 11/2006 | Wernersson | 348/348 |
| 2007/0139547 | A1 | 6/2007 | Horiuchi | |
| 2008/0079954 | A1 * | 4/2008 | Iwaki et al. | 356/614 |
| 2008/0089557 | A1 * | 4/2008 | Iwaki et al. | 382/106 |
| 2009/0296415 | A1 * | 12/2009 | Heinrich et al. | 362/465 |
| 2010/0091175 | A1 * | 4/2010 | Shintani et al. | 348/345 |
| 2010/0110182 | A1 * | 5/2010 | Kanayama | 348/140 |

FOREIGN PATENT DOCUMENTS

| | | |
|---|---|---|
| JP | 2002-296494 | 10/2002 |
| JP | 2003-134385 | 5/2003 |
| JP | 2007-36743 | 2/2007 |
| JP | 2009-159092 | 7/2009 |
| JP | 2010-183207 | 8/2010 |
| JP | 2010-249794 | 11/2010 |
| JP | 2012113064 A * | 6/2012 |

OTHER PUBLICATIONS

Murali Subbarao et al., "Depth from Defocus: A Spatial Domain Approach", International Journal of Computer Vision, vol. 13, No. 3, Dec. 1994, pp. 271-294.

Takashi Matsuyama et al., "Real-time Depth Sensing from Multi-focus Images", Journal of Information Processing Society of Japan, vol. 39, No. 7, Jul. 1998, pp. 2149-2158 (with partial English translation).

Shinsaku Hiura et al., "Multi-Focus Range Finder with Coded Aperture", IEICE Transactions on Information and Systems, D-II, vol. J82-D-II, No. 11, Nov. 1999, pp. 1912-1920 (with English translation).

* cited by examiner

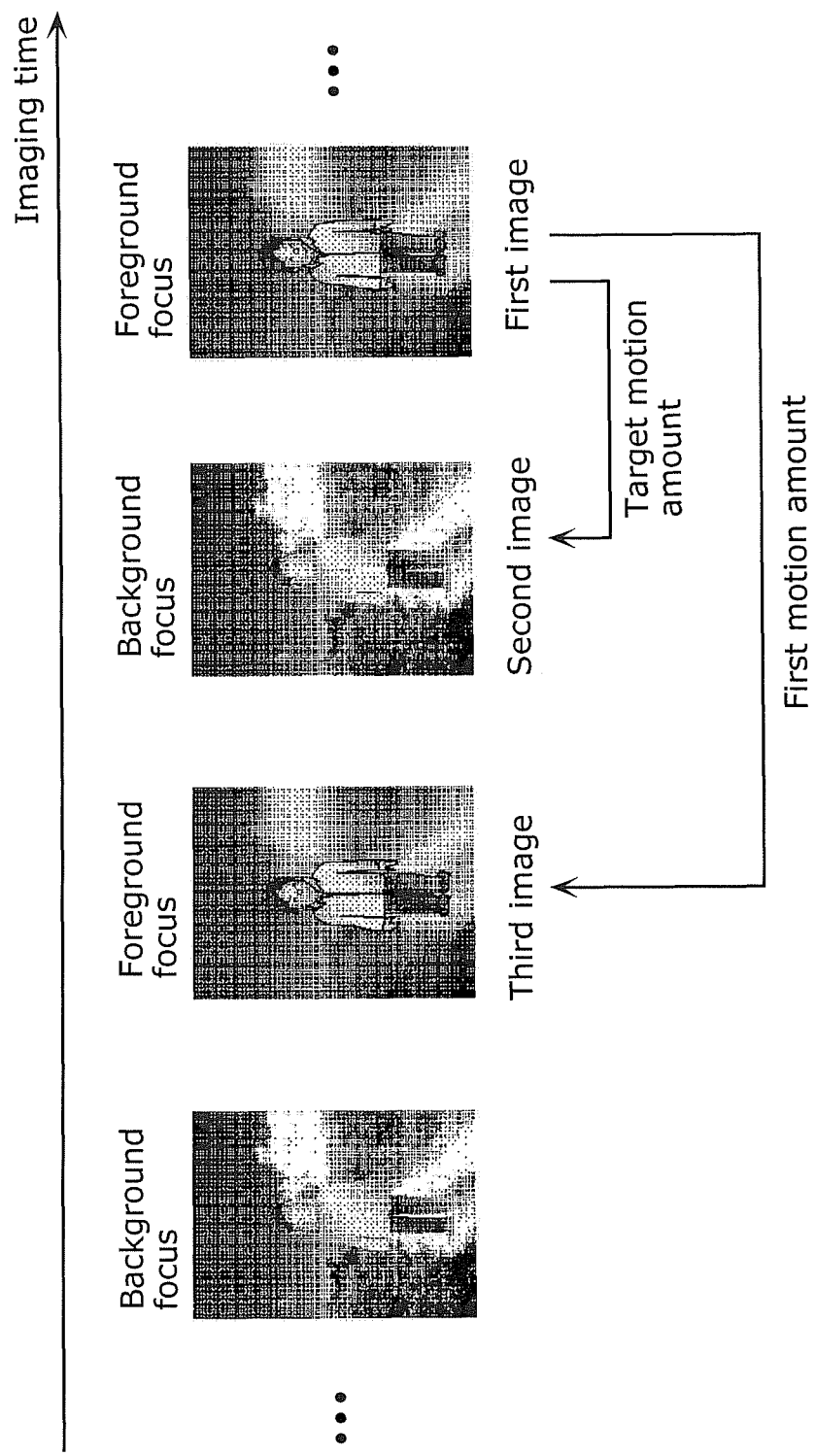

Search source image

Search destination image

IMAGE PROCESSING APPARATUS AND IMAGE PROCESSING METHOD

TECHNICAL FIELD

1. Background Art

The present invention relates to an image processing apparatus and an image processing method both for performing image processing such as measuring a subject distance or generating an HDR image, using a plurality of captured images acquired in a plurality of imaging states.

2. Background of Invention

When capturing an image with a camera, if the depth in three-dimensional scene, i.e., a subject distance that indicates a distance from the camera to a subject can be measured simultaneously with acquisition of a captured image of the subject, various applications such as image display, conversion, and recognition become possible. As an example of applications using the subject distance, it is possible by using from a single captured image and a subject distance for this captured image to virtually generate an image viewed from different viewpoints according to the principle of triangulation and to generate stereo or a three-dimensional image corresponding to multiple viewpoints. If the captured image is divided into areas based on the subject distance, it is also possible to cut out only a subject that is positioned at a specific subject distance or to adjust image quality.

The following are two main techniques for use in non-contact measurement of a subject distance.

The first are active techniques for irradiating a subject with infrared rays, ultrasound, laser light, or the like and measuring a subject distance based on the time taken to receive a reflected wave, the angle of the reflected wave, or the like. In general, using this method enables highly accurate measurement if the subject distance is short, but a problem arises in that active light irradiation/receiving devices, which are unnecessary for ordinary cameras, become necessary. If the subject is farther away and the light irradiation device has a low output level, there is a problem that irradiation light that can reach the subject is weak and the accuracy in measuring the subject distance decreases. On the other hand, if the light irradiation device has a high output level, there is a problem of increase in power consumption. In the case of using laser light, if the light irradiation device has a high output level, a problem arises in that the usage environment is limited due to possible occurrence of problems in terms of safety.

The second are passive techniques for measuring a subject distance using only captured images acquired by a camera. There are many passive methods, and one example thereof is a method called "depth from defocus (hereinafter, referred to as "DFD")" that uses a correlation value in out-of-focus amount between captured images. In general, the out-of-focus amount occurring in a captured image is uniquely determined for each camera in accordance with the relationship between a focus state (in-focus state of the lens) during shooting and a subject distance. DFD uses this characteristic and measures the relationship between the subject distance and the correlation value in out-of-focus amount in a captured image by capturing a subject at a known subject distance in different focus states in advance. Through this, if actual image capturing is performed in a plurality of focus states, it is possible to measure the subject distance by calculating a correlation value in out-of-focus amount between images (see NPL 1, for example).

As an example of techniques for capturing images in a plurality of focus states, there is a technique in which light incident on a camera is divided into multiple lights and these lights are received by image sensors that are disposed at different distances, as described in NPL 2. This technique enables simultaneous capturing of a plurality of images in different focus states, and thus there is no difference in shooting timing between images. However, there are problems that a plurality of image sensors are required to be used and that a special configuration such as disposing the image sensors at different distances is necessary.

Meanwhile, as an example of techniques for capturing images in a plurality of focus states with a camera configuration using a single plate image sensor, there is a technique using a focus adjustment mechanism implemented by auto focusing or the like. This is a technique for sequentially capturing a plurality of images while controlling the focus adjustment mechanism. In this case, by simply controlling the focus adjustment mechanism and the shooting timing appropriately without adding a new device, it is possible to capture images in a plurality of focus states and measure the subject distance.

CITATION LIST

Patent Literature

[PTL 1] Japanese Unexamined Patent Application Publication No. 2010-249794

Non-Patent Literature

[NPL 1] M. Subbarao and G. Surya, "Depth from Defocus: A Spatial Domain Approach," International Journal of Computer Vision, Vol. 13, No. 3, pp. 271-294, 1994.

[NPL 2] T. Matsuyama and T. Takemura, "Real-Time Depth Sensing from Multi-Focus Images," Transactions of Information Processing Society of Japan, Vol. 39, No. 7, pp. 2149-2158, 1998.7.

[NPL 3] S. Hiura, T. Matsuyama, "Multi-Focus Range Finder with Coded Aperture," Transactions of Institute of Electronics, Information and Communication Engineers of Japan, Vol. J82-D-II, No. 11, pp. 1912-1920, 1999.11.

SUMMARY OF INVENTION

With the technique for sequentially capturing a plurality of images by controlling the focus adjustment mechanism, however, the shooting timing differs between the images. Thus, if the subject moves or if the imaging direction of the camera changes, a shift in the position of the subject occurs between the captured images. In the measurement of the subject distance using DFD, it is assumed that neither the subject nor the camera move, i.e., there is no shift in the position of the subject between captured images, and compares correlation values in out-of-focus amount regarding the same subject are compared between images captured in a plurality of focus states. Thus, with the measurement of the subject distance using DFD that uses a plurality of captured images, there is a problem that if there is a shift in the position of the subject, the above comparison cannot be performed accurately and accordingly the accuracy of measurement of the subject distance decreases.

In other words, in the case of performing image processing using captured images acquired in different imaging states, if there is no shift in the position of the subject between the captured images, the image processing can be performed favorably. However, if a difference in the imaging state such as the focus state or the exposure state and a shift in the position of the subject have occurred at the same time, there is a problem of decrease in the accuracy of image processing.

The present invention has been achieved in light of the above-described problems, and it is an object of the present invention to provide an image processing apparatus and an image processing method that enable more stable and more highly accurate image processing even if there is a shift in the position of the subject between a plurality of captured images acquired in different imaging states.

In order to solve the above-described problems, an image processing apparatus according to an embodiment of the present invention is an image processing apparatus for measuring a subject distance using a plurality of captured images acquired by capturing the same subject in a plurality of focus states. The image processing apparatus includes a target motion amount estimation unit configured to estimate a target motion amount that represents an amount of shift in a position of the subject between a first image and a second image among the captured images, the first image being captured in a first focus state, and the second image being captured in a second focus state different from the first focus state, a corrected image generation unit configured to generate a corrected image by performing motion compensation on the second image based on the target motion amount, and a subject distance measurement unit configured to measure a subject distance for the first image based on a correlation value in out-of-focus amount between the first image and the corrected image.

Note that such a general and specific embodiment may be implemented by a system, a method, an integrated circuit, a computer program, or a recording medium or may be implemented by any combination of a system, a method, an integrated circuit, a computer program, and a recording medium.

The present invention enables more stable and more highly accurate measurement of a subject distance even if there is a shift in the position of a subject between a plurality of captured images acquired in different imaging states.

BRIEF DESCRIPTION OF DRAWINGS

FIG. 4 is a diagram illustrating the relationship of a plurality of captured images, a target motion amount, and a first motion amount according to Embodiment 1 of the present invention.

DETAILED DESCRIPTION OF INVENTION

Figure 1:
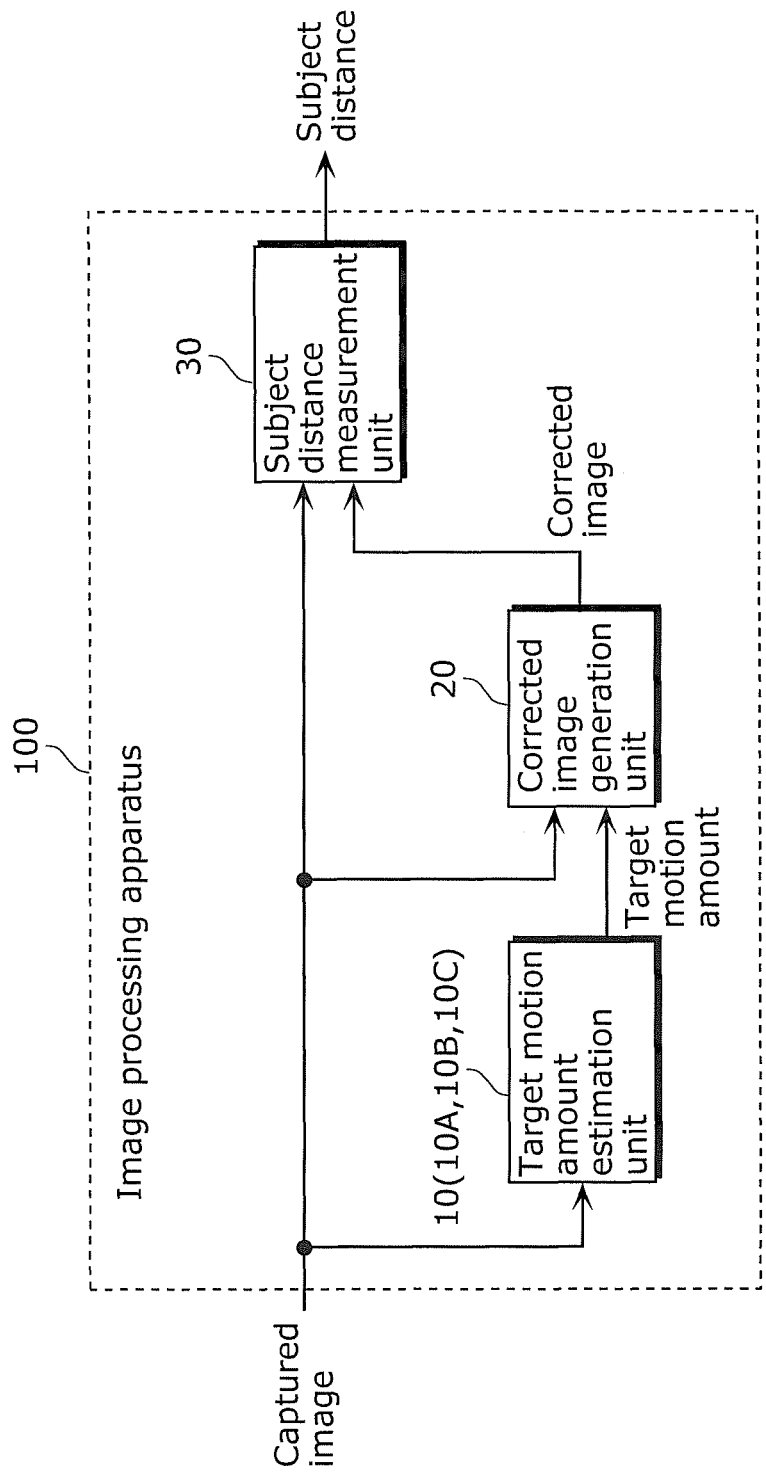
FIG. 1 is a block diagram illustrating an exemplary configuration of an image processing apparatus according to Embodiments 1, 2, and 3 of the present invention.

In order to solve the above-described problems, an image processing apparatus according to an embodiment of the present invention is an image processing apparatus for measuring a subject distance using a plurality of captured images acquired by capturing the same subject in a plurality of focus states. The image processing apparatus includes a target motion amount estimation unit configured to estimate a target motion amount that represents an amount of shift in a position of the subject between a first image and a second image among the captured images, the first image being captured in a first focus state, and the second image being captured in a second focus state different from the first focus state, a corrected image generation unit configured to generate a corrected image by performing motion compensation on the second image based on the target motion amount, and a subject distance measurement unit configured to measure a subject distance for the first image based on a correlation value in out-of-focus amount between the first image and the corrected image.

According to the image processing apparatus with this configuration, a corrected image from which a shift in the position of the subject from the first image has been eliminated or reduced to enable calculation of the subject distance is generated by motion compensation, and the subject distance is calculated using the first image and the corrected image. Thus, even if a shift in the position of the subject has occurred between captured images, the subject distance can be measured with high accuracy. In other words, in the image processing apparatus with this configuration, even if a shift in the position of the subject has occurred between captured images acquired in different focus states, a corrected image is generated by motion compensation so that the position of the subject is the same as in the first image. Accordingly, only the focus state differs between the first image and the corrected image or the degree of the position shift therebetween is very small, and thus it is possible to favorably perform the measurement of the subject distance using DFD.

Note that the subject as used here refers to the whole shown in captured images and includes not only a person or the like but also the background image or the like.

For example, the image processing apparatus may be configured to receive the first image, the second image, and a third image, the second image being captured during a time interval between the first image and the third image, and the third image being captured in the first focus state at a time different from a time when the first image is captured. The target motion amount estimation unit includes a first motion amount estimation unit configured to estimate a first motion amount that represents an amount of shift in a position of the subject between the first image and the third image, and a target motion amount determination unit configured to estimate the target motion amount using the first motion amount.

With this configuration, the target motion amount is obtained from the highly accurate first motion amount obtained from the first and third images that have been acquired in the same focus state. Thus, even between captured images acquired in different focus states, the target motion amount can be estimated with high accuracy, and as a result, it is possible to measure the subject distance with high accuracy.

For example, a configuration is also possible in which the target motion amount determination unit: is configured to estimate the target motion amount by adding a magnitude of the first motion amount by a ratio of an imaging time interval between the first image and the third image to an imaging time interval between the first image and the second image to obtain a magnitude of the target motion amount.

With this configuration, even if the first, second, and third images have not been captured at equal imaging time intervals, the target motion amount can be favorably obtained. This is in particular useful when there is a plurality of second images, because it is often the case that the imaging time interval between a second image and the first image differs from that between a second image and the third image.

For example, a configuration is also possible in which the target motion amount estimation unit further includes a second motion amount estimation unit configured to estimate a second motion amount that represents an amount of position shift between the first image and the second image, and the target motion amount determination unit is configured to estimate the target motion amount using the first motion amount and the second motion amount.

For example, a configuration is also possible in which the target motion amount determination unit is configured to determine accuracy of the second motion amount based on a difference in pixel value between a calculation target pixel that is included in the second image and for which the target motion amount is to be calculated among pixels that constitute the second image and a pixel that is included in the first image and corresponds to the calculation target pixel, and when it is determined that the accuracy of the second motion amount is higher than a threshold value, estimate the second motion amount as the target motion amount, and when it is determined that the accuracy of the second motion amount is lower than the threshold value, estimate the target motion amount using the first motion amount.

With this configuration, if the second motion amount is highly accurate, the second motion amount that is directly obtained from the first image and the second image is used. In general, since it is thought that a directly obtained motion amount is more accurate than an indirectly obtained motion amount, it is possible to estimate the target motion amount with higher accuracy.

For example, a configuration is also possible in which the target motion amount estimation unit further includes a third motion amount estimation unit configured to estimate a third motion amount that represents an amount of position shift between the second image and the third image, and the target motion amount determination unit is configured to estimate the target motion amount using the third motion amount in addition to the first motion amount and the second motion amount.

For example, a configuration is also possible in which the target motion amount determination unit is configured to, when a total of the second motion amount and the third motion amount is equal to the first motion amount, estimate the second motion amount as the target motion amount, and when the total of the second motion amount and the third motion amount is not equal to the first motion amount, determine accuracy of the second motion amount based on a difference in pixel value between a pixel in the second image for which the target motion amount is to be calculated and a corresponding pixel in the first image, determine accuracy of the third motion amount based on a difference in pixel value between a pixel in the second image for which the target motion amount is to be calculated and a corresponding pixel in the third image, and when it is determined that the accuracy of the second motion amount is higher than a threshold value, estimate the second motion amount as the target motion amount, and when it is determined that the accuracy of the second motion amount is lower than the threshold value, estimate a motion amount that is obtained by subtracting the third motion amount from the first motion amount, as the target motion amount.

With this configuration, even if the second motion amount is not so accurate, the target motion amount can be estimated using the highly accurate first and third images that have been directly obtained. Thus, it is possible to estimate the target motion amount with higher accuracy. Note that the "subtraction" of the third motion amount from the first motion amount refers to subtraction in a vector operation.

For example, a configuration is also possible in which the image processing apparatus further includes a blur area determination unit configured to determine an area where blur has occurred as a blur area based on the target motion amount, and a subject distance compensation unit configured to, for each pixel that constitutes the blur area, measure the subject distance for the first image using a subject distance for a non-blur area where the blur has not occurred in the first image, or a subject distance for another captured image for which the subject distance has been obtained in advance, wherein the subject distance measurement unit is configured to, for each pixel that constitutes the non-blur area, obtain the subject distance based on a correlation value in out-of-focus amount between the first image and the corrected image.

With this configuration, even if blur has occurred in captured images, the subject distance can be measured with high accuracy.

Here, the blur as used here refers to motion blur occurring in captured images when the movement of the subject or a change in the imaging direction is fast and accordingly the position of the subject changes greatly during exposure time. In this case, the captured images are affected by not only defocus occurring due to a mismatch between the subject distance and the focus state, but also this blur. In such a case, since conventional image processing techniques do not take these influences into consideration, there is a problem of decrease in the accuracy of measurement of the subject distance. In contrast, in the image processing apparatus with this configuration, the subject distance in an area that is not affected by blur is measured, and thus it is possible to measure the subject distance with high accuracy.

With this configuration, since captured images that are used are those that have been acquired in different focus states and are used in general subject distance measurement, it is possible to use a general subject distance measurement method when measuring the subject distance.

In order to solve the above-described problem, an image processing apparatus according to an embodiment of the present invention is an image processing apparatus for performing image processing using a plurality of captured images acquired by capturing the same subject in a plurality of imaging states. The image processing apparatus includes a target motion amount estimation unit configured to estimate a target motion amount that represents an amount of shift in the position of the subject between a first image and a second image among the captured images, the first image being captured in a first imaging state, and the second image being captured in a second imaging state different from the first imaging state, a corrected image generation unit configured to generate a corrected image by performing motion compensation on the second image based on the target motion amount, and an image processing unit configured to perform image processing using the first image and the corrected image.

As described above, in the case where image processing is performed using captured images acquired in different imaging states, if a difference in the imaging state and a shift in the position of a subject have occurred at the same time, there is a problem of decrease in the accuracy of image processing.

According to the image processing apparatus with this configuration, a corrected image from which a shift in the position of the subject from the first image has been eliminated is generated by motion compensation, and image processing is performed using the first image and the corrected image. Thus, it is possible to perform image processing using a plurality of captured images that differ in only the imaging state and to thereby prevent decrease in the accuracy of image processing.

For example, the image processing apparatus may be configured such that the image processing apparatus receives the first image captured in a first exposure state and the second image captured in a second exposure state, and the image processing unit is configured to perform the image processing that involves compositing the first image and the corrected image and generating a composite image with a wide dynamic range.

According to the image processing apparatus with this configuration, a corrected image from which a shift in the position of the subject from the first image has been eliminated is generated by motion compensation, and a high dynamic range (HDR) image is generated using the first image and the corrected image. Thus, even if a shift in the position of the subject has occurred between captured images, the HDR image can be generated with high accuracy.

An image processing method according to an embodiment of the present invention is an image processing method for measuring a subject distance using a plurality of captured images acquired by capturing the same subject in a plurality of focus states. The image processing method includes estimating a target motion amount that represents an amount of shift in the position of the subject between a first image and a second image among the captured images, the first image being captured in a first focus state, and the second image being captured in a second focus state different from the first focus state, generating a corrected image by performing motion compensation on the second image based on the target motion amount, and measuring a subject distance for the first image based on a correlation value in out-of-focus amount between the first image and the corrected image.

An image processing method according to another embodiment of the present invention is an image processing method for performing image processing using a plurality of captured images acquired by capturing the same subject in a plurality of imaging states. The image processing method includes estimating a target motion amount that represents an amount of shift in the position of the subject between a first image and a second image among the captured images, the first image being captured in a first imaging state, and the second image being captured in a second imaging state different from the first imaging state, generating a corrected image by performing motion compensation on the second image based on the target motion amount, and performing image processing using the first image and the corrected image.

Hereinafter, embodiments of the present invention will be described in detail with reference to the drawings. Note that the embodiments described below are all preferable specific examples of the present invention. Constituent elements, positions where the constituent elements are disposed, forms of connection of the constituent elements, processing, a sequence of processing, and the like shown in the following embodiments are merely examples and do not intend to limit the present invention. Among the constituent elements shown in the following embodiments, those that are not described in the independent claims that represent the most significant concepts of the invention are described as arbitrary constituent elements.

Embodiment 1

An image processing apparatus according to Embodiment 1 of the present invention will be described with reference to FIGS. 1 to 5B.

The image processing apparatus of this embodiment is an apparatus for measuring a subject distance from a plurality of captured images acquired in a plurality of imaging states, using DFD. Now, a case will be described in which the image processing apparatus is provided in an imaging apparatus capable of capturing a moving image.

Here, imaging states include, for example, focus states, exposure states, and ISO sensitivity. In this embodiment, since the image processing apparatus performs measurement of a subject distance using DFD, the following description takes the example of a case where the imaging states are focus states.

Figure 19:
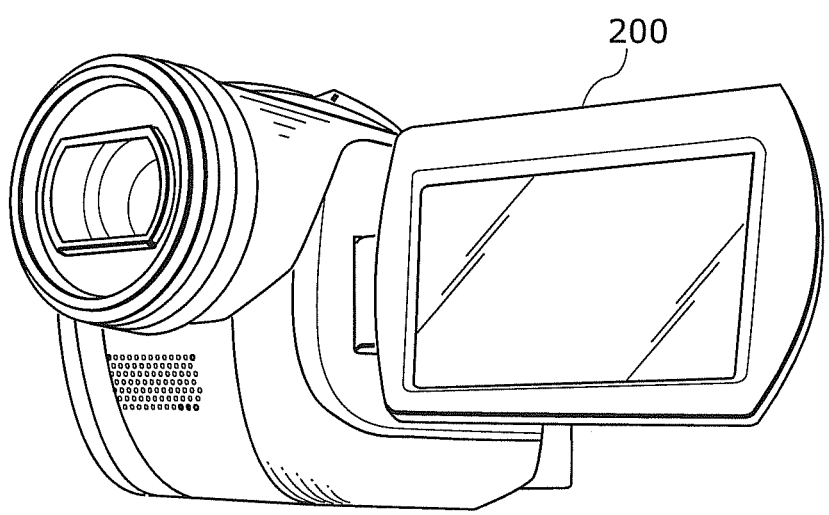
FIG. 19 is an external view illustrating an example of a camera in which an image processing apparatus of the present invention is provided.

Also, in this case, the imaging apparatus of this embodiment is a video camera. FIG. 19 is an external view illustrating an example of a video camera 200. The video camera 200 is configured to capture a moving image by alternately switching foreground focus (corresponding to a first focus state in this embodiment) and background focus (corresponding to a second focus state in this embodiment) at predetermined time intervals. The video camera 200 alternately outputs a background focused image captured in background focus and a foreground focused image captured in foreground focus to the image processing apparatus. Note that while this embodiment takes the example of a case where the image processing apparatus is provided in the video camera 200, the image processing apparatus may be provided in equipment other than the video camera 200 that is capable of capturing a moving image (e.g., a portable telephone), or may be provided in other apparatuses that are capable of acquiring captured images from an imaging apparatus.

The foreground focus as used here refers to an imaging state in which in the in-focus range of the video camera 200, a position at the closest distance from the camera is focused on, and the background focus refers to an imaging state in which in the above in-focus range, a position at the farthest distance (infinite distance) from the camera is focused on.

Configuration of Image Processing Apparatus of Embodiment 1

Figure 2:
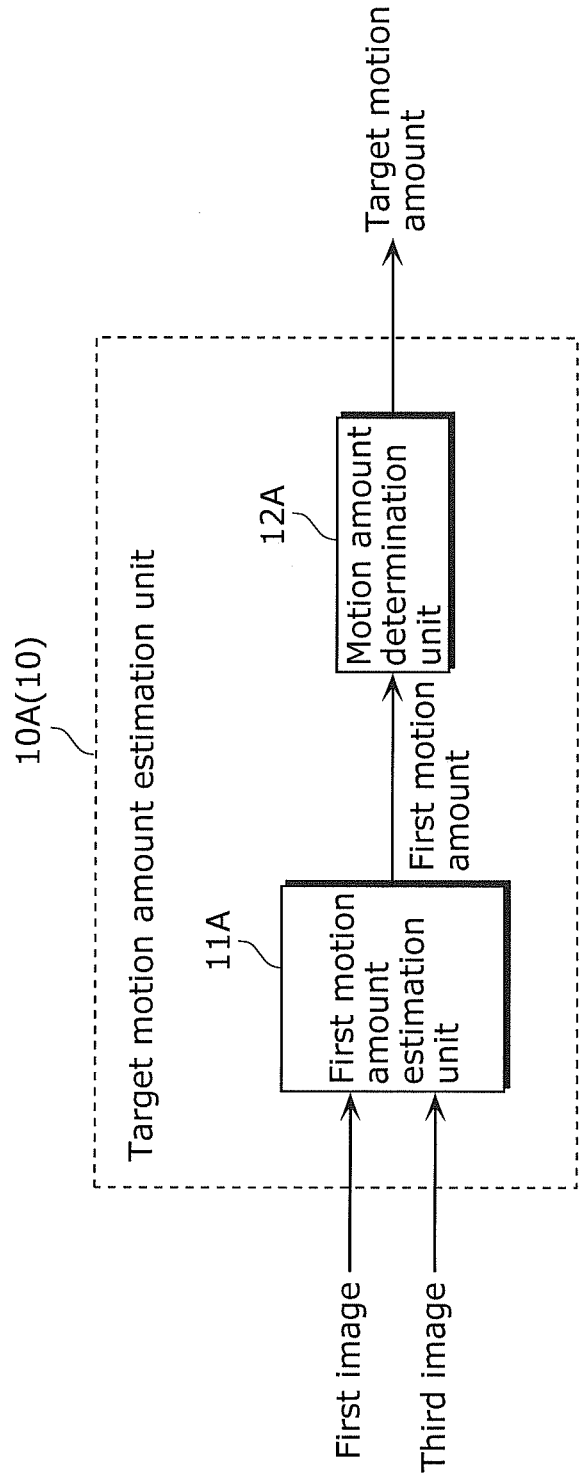
FIG. 2 is a block diagram illustrating an exemplary configuration of a target motion amount estimation unit according to Embodiment 1 of the present invention.

First, a configuration of an image processing apparatus 100 will be described with reference to FIGS. 1 and 2. FIG. 1 is a block diagram illustrating an exemplary configuration of the image processing apparatus 100.

The image processing apparatus 100 of this embodiment is an apparatus for measuring a subject distance from a plurality of captured images acquired in background focus and foreground focus, and includes a target motion amount estimation unit 10 (in this embodiment, 10A), a corrected image generation unit 20, and a subject distance measurement unit 30 as shown in FIG. 1.

The image processing apparatus 100 is configured to alternately and sequentially acquire background focused images of a subject captured in background focus and foreground focused images of the same subject captured in foreground focus at different times from the background focused images, from the video camera 200. The following description is given on the assumption that a captured image for which the subject distance is to be calculated is a first image, the image captured immediately before the first image is a second image, and the image captured immediately before the second image is a third image. The first image and the third image have been captured in the same focus state. Note that while the following description takes the example of a case where a predetermined foreground focused image is targeted for the calculation of the subject distance (the foreground focus is the first focus state), even in the case where a background focused image is targeted for the calculation of the subject distance (background focus is the second focus state), the subject distance can be calculated in the same manner. Alternatively, focus states other than the foreground focus and the background focus may be used.

The target motion amount estimation unit 10A estimates, as a target motion amount, the amount of shift in the position of the subject between the first image captured in foreground focus and the second image captured in background focus among captured images acquired by the video camera 200, and outputs the target motion amount to the corrected image generation unit 20. Note that the target motion amount is a vector quantity and is defined by the direction and magnitude of the position shift. FIG. 2 is a block diagram illustrating an exemplary configuration of the target motion amount estimation unit 10A. As illustrated n FIG. 2, the target motion amount estimation unit 10A includes a first motion amount estimation unit 11A and a motion amount determination unit 12A.

The first motion amount estimation unit 11A receives the first image and the third image that have been captured in the same focus state, estimates the amount of shift in the position of the subject between the first image and the third image as the first motion amount, and outputs the first motion amount to the motion amount determination unit 12A. Note that the first motion amount is a vector quantity and is defined by the direction and magnitude of the position shift.

The motion amount determination unit 12A estimates the amount of shift in the position of the subject between the first image and the second image as a target motion amount, based on the first motion amount.

The corrected image generation unit 20 gives motion compensation to the second image based on the target motion amount so as to generate a corrected image that does not have a shift in the position of the subject from the first image, and outputs the corrected image to the subject distance measurement unit 30.

The subject distance measurement unit 30 measures a subject distance using DFD, based on a correlation value in out-of-focus amount between the first image and the corrected image.

The following is a description of the principle of DFD in which a subject distance is measured from a plurality of captured images acquired in different focus states, based on a correlation value in out-of-focus amount. Note that this principle of DFD is also described in PTL 1 and NPL 3.

In general, if an image captured through the optical system of a camera is subjected to a two-dimensional Fourier transform, frequency information I(u, v) of that image is expressed as in Formula 1 below.

[Formula 1]

$$I(u,v)=OTF(u,v,d)\cdot S(u,v) \quad (1)$$

Here, variables u and v represent frequency components in two-dimensional Fourier space. Also, S(u, v) represents frequency information of an all-range focused image captured so that the out-of-focus amount is zero. Furthermore, OTF(u, v, d) represents an optical transfer function when a subject at a distance d from the camera has been captured, the optical transfer function being associated with the focus state during imaging. As can be seen from Formula 1, the frequency information I(u, v) of the captured image is given by the product of the frequency information S(u, v) of the all-range focused image and the optical transfer function OTF(u, v, d) during imaging.

Here, if the subject at the distance d is captured in two different focus states, frequency information $I_1(u, v)$ and frequency information $I_2(u, v)$ of the two captured images are respectively expressed by Formulas 2 and 3 below. Note here that there is no shift in the position of the subject between the two captured images.

[Formula 2]

$$I_1(u,v)=OTF_1(u,v,d)\cdot S(u,v) \quad (2)$$

[Formula 3]

$$I_2(u,v)=OTF_2(u,v,d)\cdot S(u,v) \quad (3)$$

Dividing both sides of these formulas by each other yields Formula 4 below that does not depend on the all-range focused image S(u, v).

[Formula 4]

$$\frac{I_1(u,v)}{I_2(u,v)}=\frac{OTF_1(u,v,d)}{OTF_2(u,v,d)} \quad (4)$$

Here, since $OTF_1(u, v, d)$ and $OTF_2(u, v, d)$ represent optical characteristics when the respective images have been captured, it is possible to measure and store characteristics for every distance d in advance. Accordingly, in the case where the two images $I_1(u, v)$ and $I_2(u, v)$ have been captured in different focus states, the subject distance can be measured by obtaining such a distance d on the right side of Formula 4 that agrees with the left side.

However, in general, captured images involve the influence of noise, quantization errors, or the like, and it cannot be ensured with certainty that there is such a distance d that makes the values on the right and left sides in complete agreement. For this reason, as shown in Formula 5 below, it is also possible to obtain an absolute value e(d) that is a difference between the right and left sides of Formula 4 using the distance d as a parameter, and estimate a distance d that minimizes the absolute value e(d) as a distance to the subject.

[Formula 5]

$$e(d) = \sum_{u,v} \left| \frac{I_1(u, v)}{I_2(u, v)} - \frac{OTF_1(u, v, d)}{OTF_2(u, v, d)} \right| \quad (5)$$

If the configuration is such that the distance d that minimizes the absolute value e(d) is estimated as a distance to the subject, it is possible to measure the subject distance even if the characteristic of a captured image does not completely match any of the previously measured optical characteristics.

Processing Procedure of Image Processing Method of Embodiment 1

Figure 3:
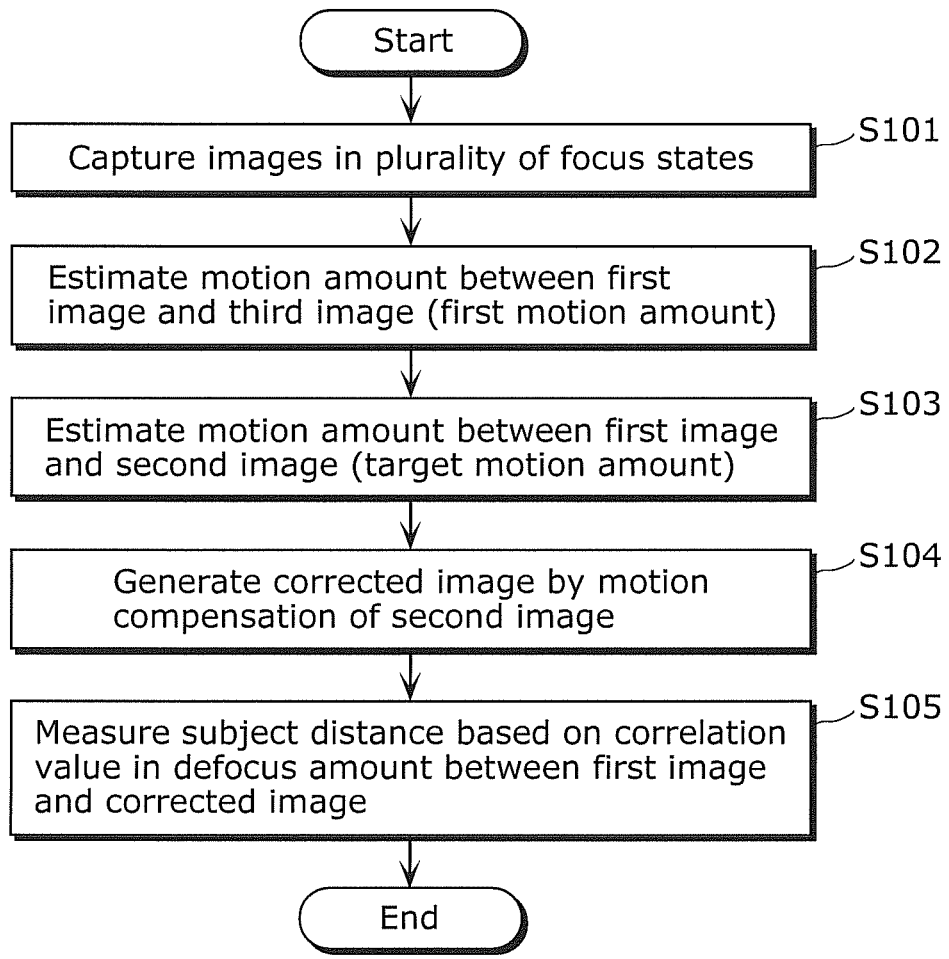
FIG. 3 is a flowchart illustrating an example of the flow of processing of an image processing method according to Embodiment 1 of the present invention.

Next, the flow of processing performed by the image processing apparatus according to Embodiment 1 of the present invention when measuring a subject distance (processing procedure of the image processing method) will be described with reference to FIGS. 3 and 4. FIG. 3 is a flowchart illustrating the processing procedure of the image processing method according to this embodiment, and FIG. 4 is a diagram illustrating the relationship of captured images, the target motion amount, and the first motion amount according to this embodiment.

First, the video camera 200 (imaging apparatus) illustrated in FIG. 19 captures images in a plurality of focus states and outputs the captured images to the image processing apparatus 100 (step S101).

The video camera 200 of this embodiment alternately and repeatedly performs imaging in foreground focus and imaging in background focus in succession of time as shown in FIG. 4, and outputs the captured foreground focused images and the captured background focused images to the image processing apparatus 100. Note that this embodiment takes the example of a case where the video camera 200 performs imaging at the same position in the same direction, i.e., a plurality of captured images are obtained by capturing the same subject. In this embodiment, the subject is a person at a close distance from the camera and the background of the person.

While this embodiment takes the example of a case where the position and the imaging direction of the video camera 200 are unchanged, the present invention is not limited to this. Also, the composition of the subject is not limited to a person and the background of the person.

In the foreground focused images in FIG. 4, because the person who stands in front is focused on (a subject at a short distance is focused on), the person standing in front appears clear, but the background appears blurred. On the other hand, in the background focused images, since the background is focused on (a subject at an infinite distance is focused on), the background appears clear, but the person standing in front appears blurred. As described previously, it is assumed that one of the foreground focused images captured in foreground focus is a first image for which the subject distance is to be measured, the background focused image captured in background focus immediately before the first image is a second image, and the foreground focused image captured in foreground focus immediately before the second image is a third image. Note that although step S101 is not an absolute necessity in the present invention, it is described as a step that configures a more preferable form. It is sufficient for the image processing apparatus 100 to be configured to capture images in a plurality of imaging states. Also, the processing of steps S102 to S105 described below may be executed in parallel with imaging by the video camera 200, or may be executed after the imaging.

Here, if there are no movement of the subject and no change in the imaging direction during imaging of the first image in foreground focus and the second image in background focus, no shift in the position of the subject will occur between the images. In this case, the subject distance can be measured through DFD processing based on Formula 5, using the first image and the second image as-is.

However, if a shift in the position of the subject has occurred between the first image and the second image, Formula 4 does not hold true and the subject distance cannot be measured because the all-range focused image S(u, v) differs between Formulas 2 and 3. Thus, in this embodiment, in order to match the all-range focused images S(u, v) in the first and second images, a motion amount that corresponds to the position shift between the images is estimated, and then a corrected image is generated by performing motion compensation on the subject shifted in position. In the following description, the motion amount between the first image and the second image is referred to as a "target motion amount".

When measuring the subject distance, as illustrated in FIG. 3, the image processing apparatus 100 first causes the first motion amount estimation unit 11A of the target motion amount estimation unit 10A to estimate a motion amount between the first image and a third image that has been captured in the same foreground focus state as the first image, as a first motion amount (step S102). Note that this estimation of the motion amount is estimation performed between the images captured in the same focus state, and only the position of the subject differs between the images. Thus, a highly accurate estimation result is obtained.

Hereinafter, the method for estimating the first motion amount between the first image and the third image will be described with reference to FIGS. 5A and 5B. Note that this embodiment takes the example of a case where a block matching method is used to estimate the motion amount.

The block matching method is a technique for estimating a motion amount between images for each block area, in which an area that is most highly correlated with an image of a block area that is set in one image (hereinafter, referred to as a "search source image") is specified from among areas in another image (hereinafter, referred to as a "search destination image") so as to estimate a motion amount. FIG. 5A is a diagram illustrating an example of the relationship between the search source image and a block of interest, and FIG. 5B is a diagram illustrating an example of the relationship between the search destination image and a search area.

Figure 5A:
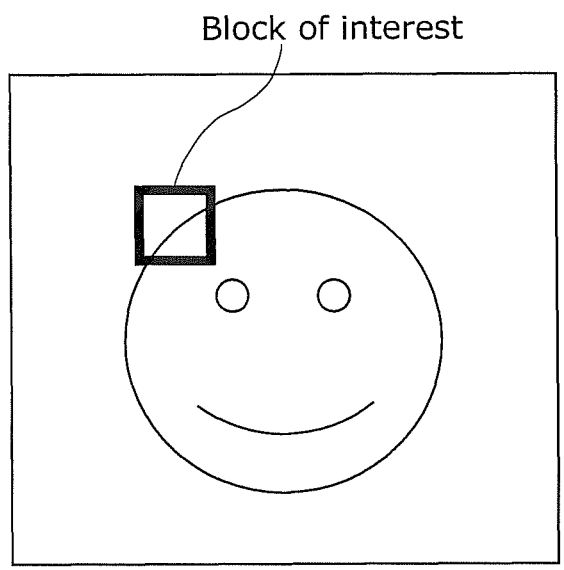
FIG. 5A is a diagram illustrating an example of the relationship between a search source image and a block of interest in block matching processing.

As illustrated in FIG. 5A, the first motion amount estimation unit 11A first sets a block of interest that consists of a plurality of pixels in the search source image (i.e., first image). The size of this block of interest can be arbitrarily set to, for example, 8-by-8 pixels or 16-by-16 pixels. In other words, the first motion amount estimation unit 11A divides the search source image into a plurality of block areas of the same size and sequentially sets the block areas as a block of interest.

Next, the first motion amount estimation unit 11A sets a search area in the search destination image (i.e., third image). This search area indicates a range in which an area that is most highly correlated with the block of interest in the search source image is searched for, the search area being larger than the block of interest. Also, the search area is preferably set at a position close to the position of the block of interest in the search source image.

Next, the first motion amount estimation unit 11A sets a search block by cutting out a block area of the same size as the block of interest of the search source image from the search area of the search destination image, and calculates an evaluation value $r_{x,y}$ that represents a correlation between the images, based on Formula 6 below.

[Formula 6]

$$r_{x,y} = \sum_{i,j} |g_{x,y}(i, j) - f(i, j)| \quad (6)$$

Figure 5B:
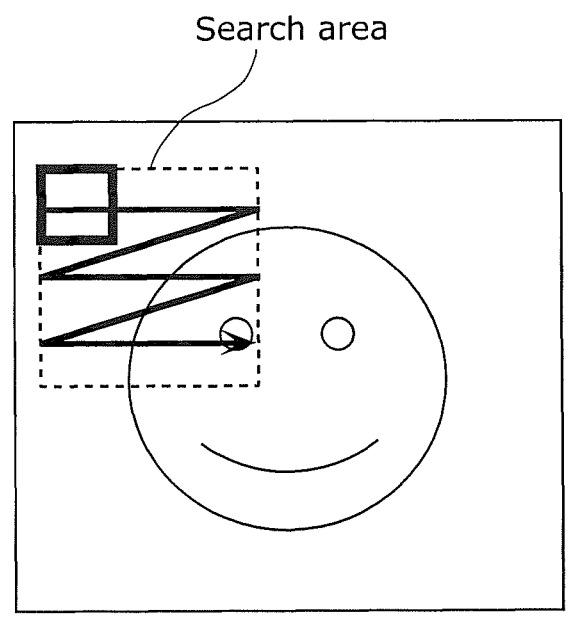
FIG. 5B is a diagram illustrating an example of the relationship between a search destination image and a search area in the block matching processing.

Here, x and y represent the coordinate position indicating the position of a block area in the search destination image, assuming that (0, 0) indicates the coordinates (x, y) of the pixel in the upper left corner of the search destination image shown in FIG. 5B. Also, (i, j) represents the coordinate position of each pixel that constitutes a block area (block of interest and search block) relative to the block area, assuming that (0, 0) indicates the coordinates (i, j) of the pixel in the upper left corner of the block area. Furthermore, f(i, j) represents the pixel value of each pixel that constitutes the block of interest set in the search source image, and $g_{x,y}(i,j)$ represents a pixel value in the search block that is cut out of the search destination image. The evaluation values $r_{x,y}$ based on Formula 6 are calculated while shifting the coordinate position (x, y) at which the search block is cut out of the search area in the search destination image, and then the coordinate position with the smallest evaluation value $r_{x,y}$ is specified. A relative position shift between this coordinate position and the corresponding coordinate position in the block of interest of the search source image represents the motion amount between the images. By performing this processing on all the block areas in the search source image, the first motion amount estimation unit 11A can estimate a motion amount for the entire image.

Next, the motion amount determination unit 12A of the target motion amount estimation unit 10A estimates the target motion amount that is a motion amount between the first image and the second image, based on the first motion amount (step S103). Here, if it is assumed that the first, second, and third images have been captured at equal time intervals, the target motion amount is determined to have the same position shift direction as the first motion amount and have half the magnitude of the first motion amount. This makes use of the characteristic that if it is a short time, the movement of the subject and a change in the imaging direction will occur with substantially constant velocity, and makes use of the relationship that if the imaging time interval between the first image and the second image is half the imaging time interval between the first image and the third image, the motion amount during that interval is also substantially half.

Note that if the imaging time intervals are not equal, the target motion amount may be determined by correcting the magnitude of the first motion amount in accordance with the ratio of the imaging time interval. Specifically, for example, the target motion amount may be obtained, assuming that magnitude of target motion amount=magnitude of first motion amount×((imaging time interval between first image and second image)/(imaging time interval between first image and third image)), and direction of target motion amount=direction of first motion amount. Note that if the case where the imaging time interval between the first image and the second image is half the imaging time interval between the first image and the third image is applied to the above equation, magnitude of the target motion amount=magnitude of first motion amount×0.5.

Upon receiving the target motion amount from the target motion amount estimation unit 10A, the corrected image generation unit 20 gives motion compensation to the second image based on the received target motion amount so as to generate a corrected image (step S104). As a result, the positions of the subject match between the first image and the corrected image, and the first image and the corrected image are in a relation where they have a common all-range focused image and differ only in out-of-focus amount. In other words, the first image and the corrected image are in a relation where their subject conditions are the same but their focus states are different.

Upon receiving received the corrected image from the corrected image generation unit 20, the subject distance measurement unit 30 measures the subject distance using DFD, based on a correlation value in out-of-focus amount between the first image and the corrected image (step S105). Here, as described above, the subject distance can be measured by obtaining the distance d that minimizes Formula 5.

According to the above-described method, the target motion amount between the first image and the second image that have been captured in different focus states is estimated using the first motion amount estimated between the first image and the third image that have been captured in the same focus state. Thus, the target motion amount can be estimated with high accuracy. By using this target motion amount for the motion compensation of the second image, it is possible to accurately generate a corrected image that has no shift in the position of the subject from the first image and thereby more favorably perform the subject distance measurement processing using DFD.

Note that if the above-described block matching method is performed between the first image and the second image, it is possible to directly calculate the motion amount between the first image and the second image even if they have different focus states. In particular, if there is only a small difference between the focus state in which the first image has been captured and the focus state in which the second image has been captured, it is highly possible to favorably estimate the motion amount. However, if there is a great difference in focus state between the first image and the second image, the out-of-focus amount will greatly differ between the images, and there will be not so much correlation between the images even if the same subject has been focused on. Thus, in this case, a great error may occur in the motion amount to be estimated. In the case of measuring the subject distance using DFD, it is generally thought that the accuracy of the subject distance measurement improves with increasing difference in the focus state between images. Thus, imaging is often performed in the latter condition According to the above-described method, in the case of measuring the subject distance using the first image and the second image that have different focus states, the motion amount between the first image and the second image can be estimated with high accuracy by using the first motion amount that is obtained between the first image and the third image with high accuracy by the block matching method. Using the target motion amount that has been estimated with high accuracy makes it possible to eliminate the position shift between the first image and the corrected image or reduce that position shift to such an extent that the subject distance measurement can be favorably performed. Accordingly, it is possible to favorably perform the subject distance measurement.

Embodiment 2

Now, an image processing apparatus according to Embodiment 2 of the present invention will be described with reference to FIGS. 1 and 6 to 8.

The image processing apparatus of this embodiment differs from the image processing apparatus 100 of Embodiment 1 in that a target motion amount estimation unit 10B includes a second motion amount estimation unit 11B configured to directly obtain a second motion amount between the first image and the second image, in addition to the first motion amount estimation unit 11A configured to obtain the first motion amount between the first image and the third image.

Like Embodiment 1, this embodiment takes the example of a case where the imaging apparatus is the video camera 200 illustrated in FIG. 19 and the imaging states are two focus states, namely, foreground focus and background focus.

Configuration of Image Processing Apparatus of Embodiment 2

First, the configuration of the image processing apparatus 100 according to Embodiment 2 will be described with reference to FIGS. 1 and 6.

Figure 6:
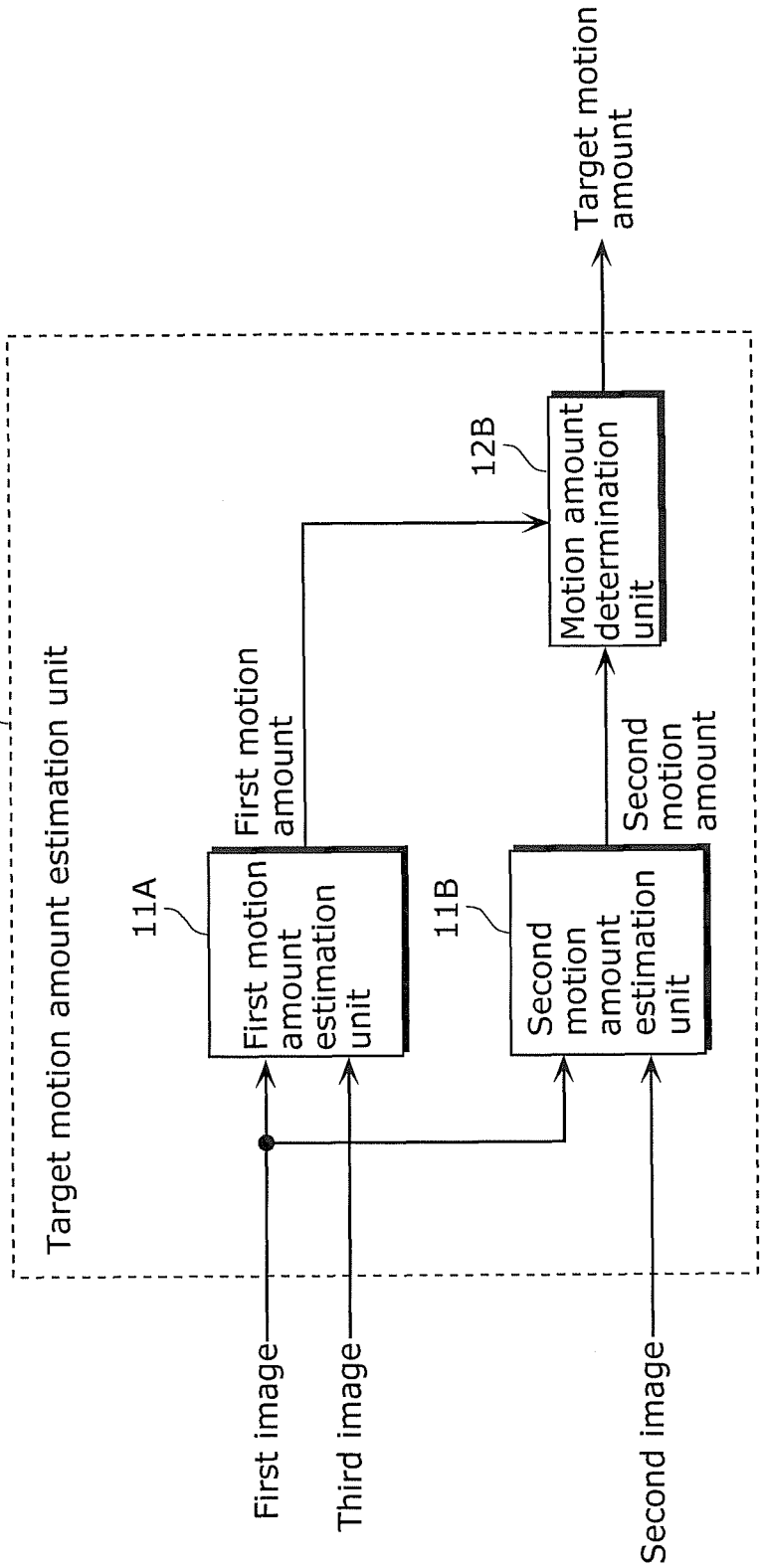
FIG. 6 is a block diagram illustrating an exemplary configuration of a target motion amount estimation unit according to Embodiment 2 of the present invention.

FIG. 6 is a block diagram illustrating an exemplary configuration of a target motion amount estimation unit 10B. Note that in the configuration of the image processing apparatus according to this embodiment, blocks that are common to those of the image processing apparatus 100 according to Embodiment 1 are denoted by the same reference numerals, and a description thereof has been omitted.

The image processing apparatus according to this embodiment has the same block configuration as the image processing apparatus 100 of Embodiment 1 illustrated in FIG. 1, and includes the target motion amount estimation unit 10B, a corrected image generation unit 20, and a subject distance measurement unit 30. Note that the configurations of the corrected image generation unit 20 and the subject distance measurement unit 30 are the same as in Embodiment 1. Also, as in Embodiment 1, the image processing apparatus of this embodiment is configured to alternately and sequentially capture background focused images and foreground focused images in succession of time, from the video camera 200. The following description is given on the assumption that a captured image for which the subject distance is to be calculated is a first image, the image captured immediately before the first image is a second image, and the image captured immediately before the second image is a third image.

The target motion amount estimation unit 10B is configured to estimate the amount of shift in the position of the subject between the first image captured in foreground focus and the second image captured in background focus, as a target motion amount, and includes the first motion amount estimation unit 11A, the second motion amount estimation unit 11B, and a motion amount determination unit 12B as illustrated in FIG. 6.

The first motion amount estimation unit 11A has the same configuration as in Embodiment 1 and is configured to obtain a first motion amount between the first image and the third image using the block matching method and output the first motion amount to the motion amount determination unit 12B.

The second motion amount estimation unit 11B is configured to estimate the amount of shift in the position of the subject between the first image and the second image using the block matching method described in Embodiment 1, as a second motion amount (corresponding to an initial estimated value) and output the second motion amount to the motion amount determination unit 12B. Note that, like the target motion amount and the first motion amount, the second motion amount is a vector quantity and is defined by the direction and magnitude of the position shift.

The motion amount determination unit 12B is configured to estimate a target motion amount that indicates a shift in the position of the subject between the first image and the second image, based on the first motion amount estimated by the first motion amount estimation unit 11A and the second motion amount estimated by the second motion amount estimation unit 11B.

Processing Procedure of Image Processing Method of Embodiment 2

Figure 7:
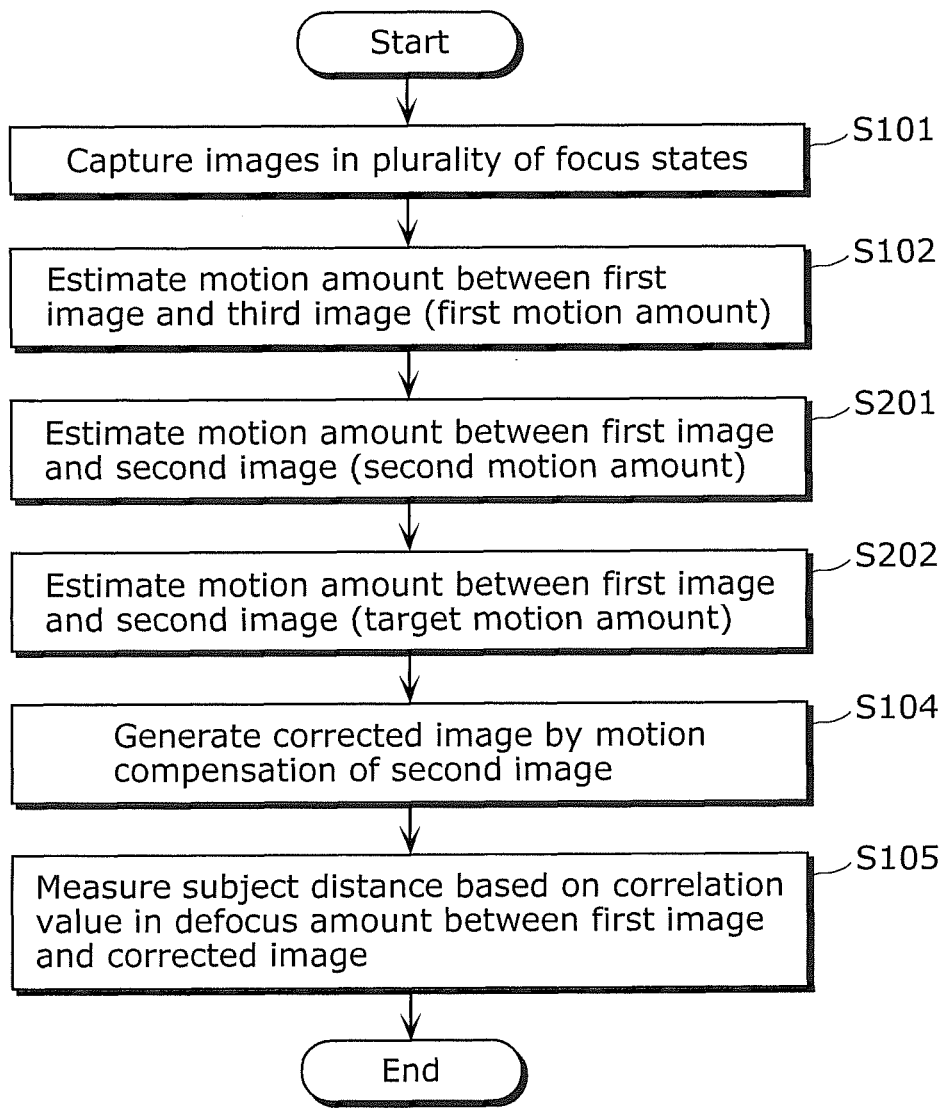
FIG. 7 is a flowchart illustrating an example of the flow of processing of an image processing method according to Embodiment 2 of the present invention.
Figure 8:
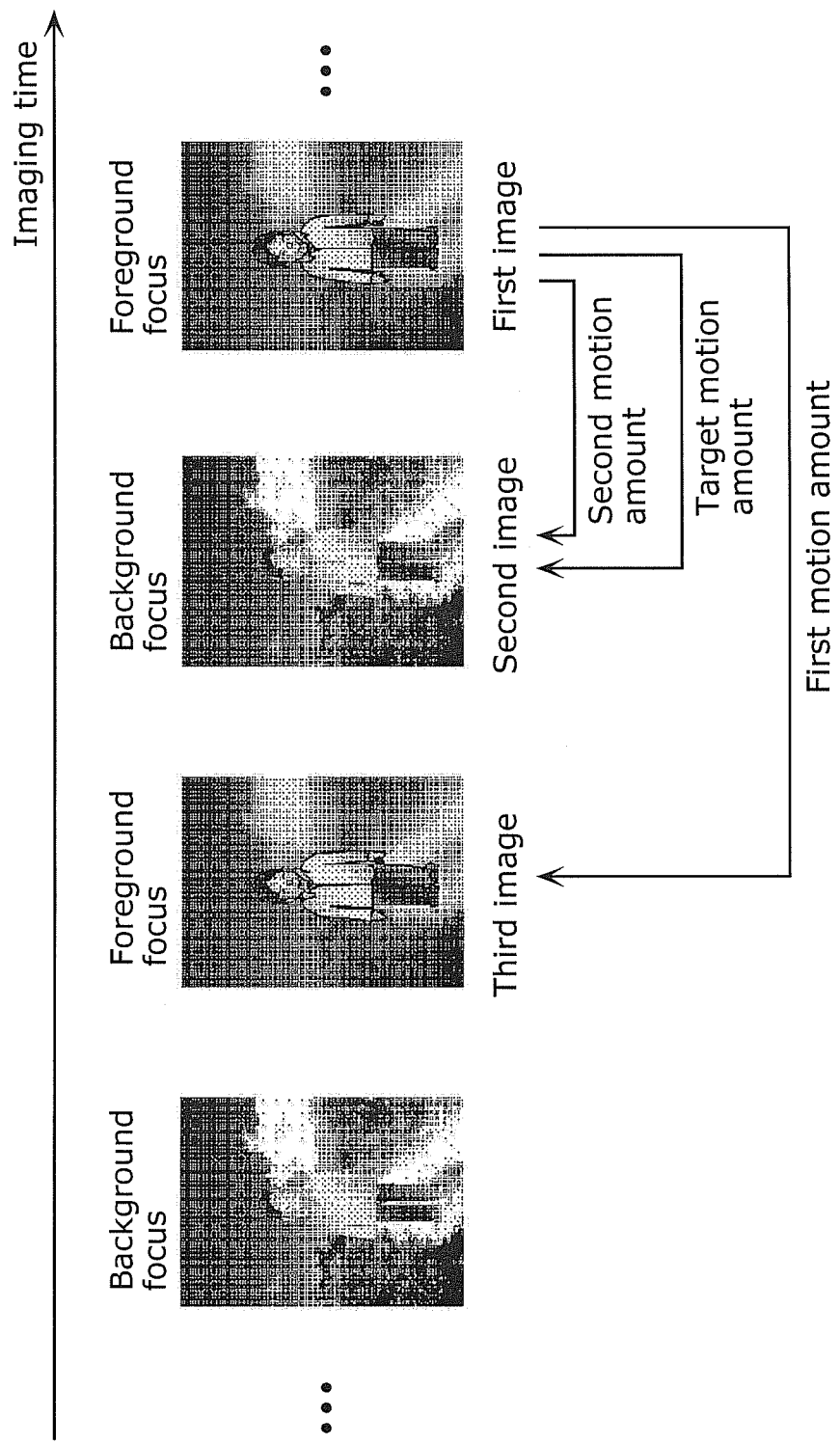
FIG. 8 is a diagram illustrating the relationship of a plurality of captured images, a target motion amount, a first motion amount, and a second motion amount according to Embodiment 2 of the present invention.

Next, the flow of processing performed by the image processing apparatus according to Embodiment 2 of the present invention when measuring a subject distance will be described with reference to FIGS. 7 and 8. FIG. 7 is a flowchart illustrating the processing procedure of the image processing method according to this embodiment, and FIG. 8 is a diagram illustrating the relationship of captured images, the target motion amount, the first motion amount, and the second motion amount according to this embodiment. Note that in the flow of processing illustrated in FIG. 7, processes that are common to those in Embodiment 1 illustrated in FIG. 3 are denoted by the same reference numerals, and a description thereof has been omitted.

First, the video camera 200 (imaging apparatus) illustrated in FIG. 19 captures images in a plurality of focus states and outputs the captured images to the image processing apparatus 100 (step S101).

When measuring the subject distance, as illustrated in FIG. 7, the image processing apparatus 100 first causes the first motion amount estimation unit 11A of the target motion amount estimation unit 10B to estimate a motion amount between the first image and the third image as the first motion amount (step S102). The processing so far is the same as in Embodiment 1.

Next, the image processing apparatus 100 causes the second motion amount estimation unit 11B of the target motion amount estimation unit 10B to estimate a second motion amount that is an initial estimated value for the motion amount between the first image and the second image (step S201). This estimation can be performed using the block matching method.

Then, the image processing apparatus 100 causes the motion amount determination unit 12B of the target motion amount estimation unit 10B to estimate the target motion amount using the first motion amount and the second motion amount (step S202).

Here, if the images have the same focus state, it is generally thought that the second motion amount that has been estimated directly has higher accuracy than the second motion amount that has been estimated indirectly from the first motion amount. That is, there are cases where the direct estimation of the second motion amount between the first image and the second image results in higher accuracy. However, as described above, in particular in the case of measuring the subject distance using DFD, it is highly possible that there is a great difference in the focus state between the first image and the second image. For this reason, if the out-of-focus amount greatly varies due to a change in the focus state, there will be not so much correlation between the images even if the same subject has been focused on, and thus a great error may occur in the motion amount to be estimated.

Accordingly, the motion amount determination unit 12B of this embodiment determines the accuracy of the second motion amount, and if the second motion amount satisfies the accuracy required for use in measuring the subject distance, sets the second motion amount as-is as the target motion amount, and if the second motion amount does not satisfy the required accuracy, estimates the target motion amount from the first motion amount as in Embodiment 1. Note that the method for estimating the target motion amount from the first motion amount is the same as in step S103 of Embodiment 1.

Here, the motion amount determination unit 12B determines the accuracy of the second motion amount based on an evaluation value $r_{x,y}$ (minimum evaluation value $r_{min}$) that is a minimum value applied in the block matching method when estimating the second motion amount. More specifically, if it has been determined that the minimum evaluation value $r_{min}$ is smaller than a predetermined threshold value (accuracy is high), the motion amount determination unit 12B uses the second motion amount as-is as the target motion amount, and if it has been determined that the minimum evaluation value $r_{min}$ is greater than the predetermined threshold value (accuracy is low), the motion amount determination unit 12B estimates the target motion amount from the first motion amount. This makes use of the characteristic that if the minimum evaluation value $r_{min}$ calculated by the block matching method is small, the degree of matching between the block of interest in the search source image and the search block specified in the search destination image is high and accordingly the motion amount has high estimation accuracy. In this case, it is thought that using the second motion amount that has been directly obtained by the application of the block matching method between the first and second images results in a higher estimation result of the target motion amount.

Upon receiving the target motion amount from the target motion amount estimation unit 10B, the corrected image generation unit 20 gives motion compensation to the second image based on the received target motion amount so as to generate a corrected image (step S104). This step S104 is the same as in Embodiment 1.

Upon receiving the corrected image from the corrected image generation unit 20, the subject distance measurement unit 30 measures the subject distance using DFD, based on a correlation value in out-of-focus amount between the first image and the corrected image (step S105). This step S105 is the same as in Embodiment 1.

According to the above-described method, if it has been determined that the estimation accuracy of the second motion amount that has been estimated between the first and second images captured in different focus states is high, that second motion amount is used as the target motion amount, and if it has been determined that the estimation accuracy of the second motion amount is low, the target motion amount can be estimated based on the first motion amount estimated between the first and third images captured in the same focus state. This enables highly accurate estimation.

Note that in this embodiment, the first motion amount estimation unit 11A may be configured to not calculate the first motion amount if it has been determined that the minimum evaluation value $r_{min}$ obtained by the second motion amount estimation unit 11B is smaller than the predetermined threshold value.

Note that in the method for estimating the target motion amount in step S202, a motion amount that is obtained by internally dividing a motion amount that is half the first motion amount and the second motion amount based on the ratio between the minimum evaluation value $r_{min}$ applied in the block matching method when estimating the first motion amount and the minimum evaluation value $r_{min}$ applied when estimating the second motion amount, may be used as the target motion amount.

Embodiment 3

Now, an image processing apparatus according to Embodiment 3 of the present invention will be described with reference to FIGS. 1 and 9 to 12.

The image processing apparatus of this embodiment differs from the image processing apparatus 100 of Embodiment 2 in that a target motion amount estimation unit 10C includes a third motion amount estimation unit 11C configured to obtain a third motion amount between the second image and the third image, in addition to the first motion amount estimation unit 11A configured to obtain the first motion amount between the first image and the third image and the second motion amount estimation unit 11B configured to directly obtain the second motion amount between the first image and the second image.

Like Embodiments 1 and 2, this embodiment takes the example of the case where the imaging apparatus is the video camera 200 illustrated in FIG. 19 and the imaging states are two focus states, namely, foreground focus and background focus.

Configuration of Image Processing Apparatus of Embodiment 3

First, the configuration of an image processing apparatus 100 according to Embodiment 3 will be described with reference to FIGS. 1 and 9.

Figure 9:
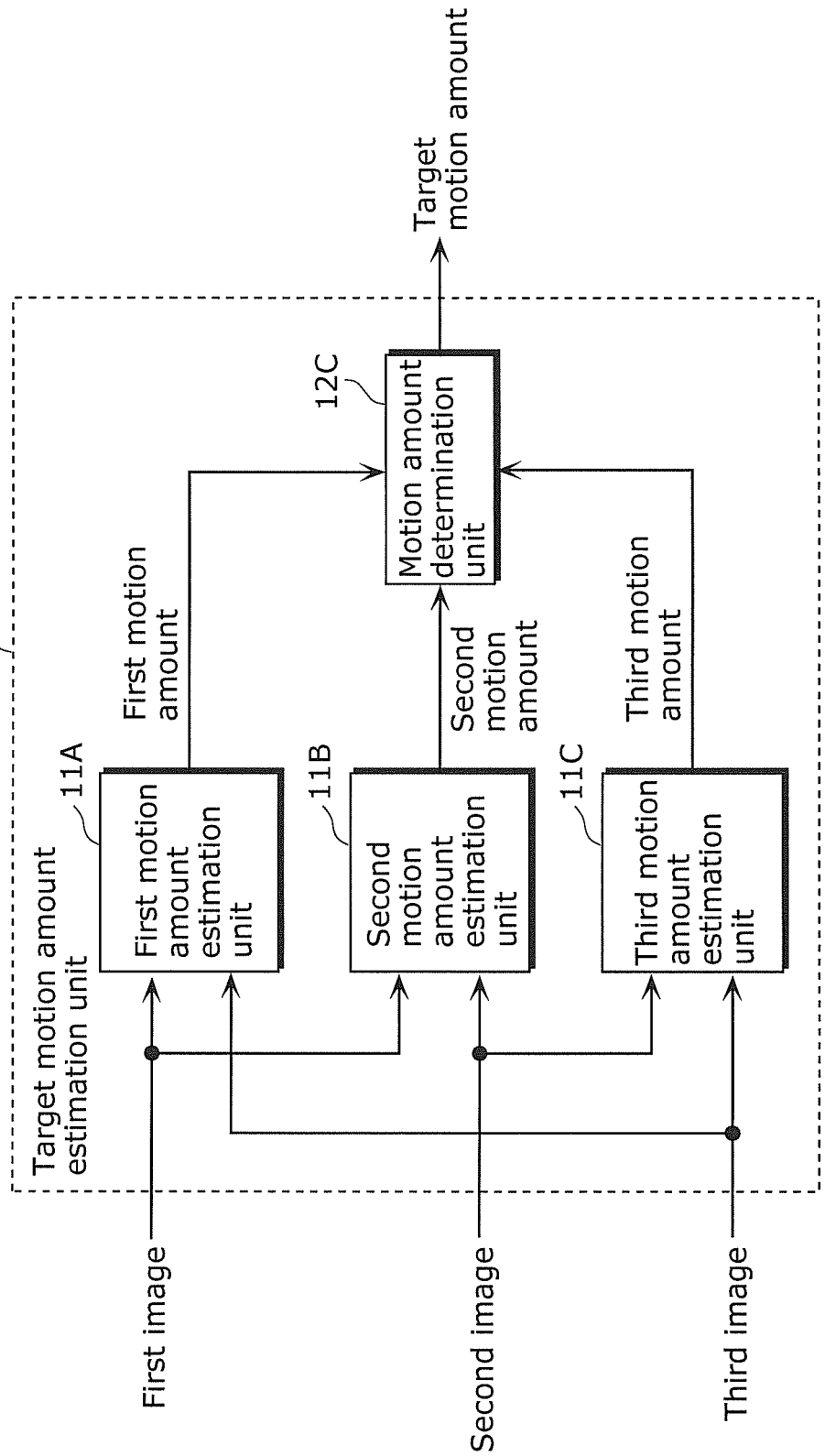
FIG. 9 is a block diagram illustrating an exemplary configuration of a target motion amount estimation unit according to Embodiment 3 of the present invention.

FIG. 9 is a block diagram illustrating an exemplary configuration of the target motion amount estimation unit 10C. Note that in the configuration of the image processing apparatus according to this embodiment, blocks that are common to those in Embodiments 1 and 2 are denoted by the same reference numerals, and a description thereof has been omitted.

The image processing apparatus of this embodiment has the same block configuration as the image processing apparatus 100 of Embodiment 1 illustrated in FIG. 1, and includes the target motion amount estimation unit 10C, a corrected image generation unit 20, and a subject distance measurement unit 30. Note that the configurations of the corrected image generation unit 20 and the subject distance measurement unit 30 are the same as in Embodiments 1 and 2. As in Embodiments 1 and 2, the image processing apparatus of this embodiment is configured to alternately and sequentially acquire background focused images captured in background focus and foreground focused images captured in foreground focus from the video camera 200. The following description is given on the assumption that the captured image for which the subject distance is to be calculated is the first image, the image captured immediately before the first image is the second image, and the image captured immediately before the second image is the third image.

The target motion amount estimation unit 10C is configured to estimate the amount of shift in the position of the subject between the first image captured in foreground focus and the second image captured in background focus as a target motion amount, and includes a first motion amount estimation unit 11A, a second motion amount estimation unit 11B, a third motion amount estimation unit 11C, and a motion amount determination unit 12C as illustrated in FIG. 9.

The first motion amount estimation unit 11A has the same configuration as in Embodiments 1 and 2 and is configured to obtain a first motion amount between the first image and the third image using the block matching method and output the first motion amount to the motion amount determination unit 12C.

The second motion amount estimation unit 11B has the same configuration as in Embodiment 2 and is configured to directly obtain a second motion amount (initial estimated value) between the first image and the second image using the block matching method and output the second motion amount to the motion amount determination unit 12C.

The third motion amount estimation unit 11C is configured to estimate the amount of shift in the position of the subject between the second image and the third image using the block matching method described in Embodiment 1 as a third motion amount and output the third motion amount to the motion amount determination unit 12C.

The motion amount determination unit 12C is configured to estimate a target motion amount that indicates the amount of the shift in the position of the subject between the first image and the second image, based on the first motion amount estimated by the first motion amount estimation unit 11A, the second motion amount estimated by the second motion amount estimation unit 11B, and the third motion amount estimated by the third motion amount estimation unit 11C.

Processing Procedure of Image Processing Method of Embodiment 3

Figure 10:
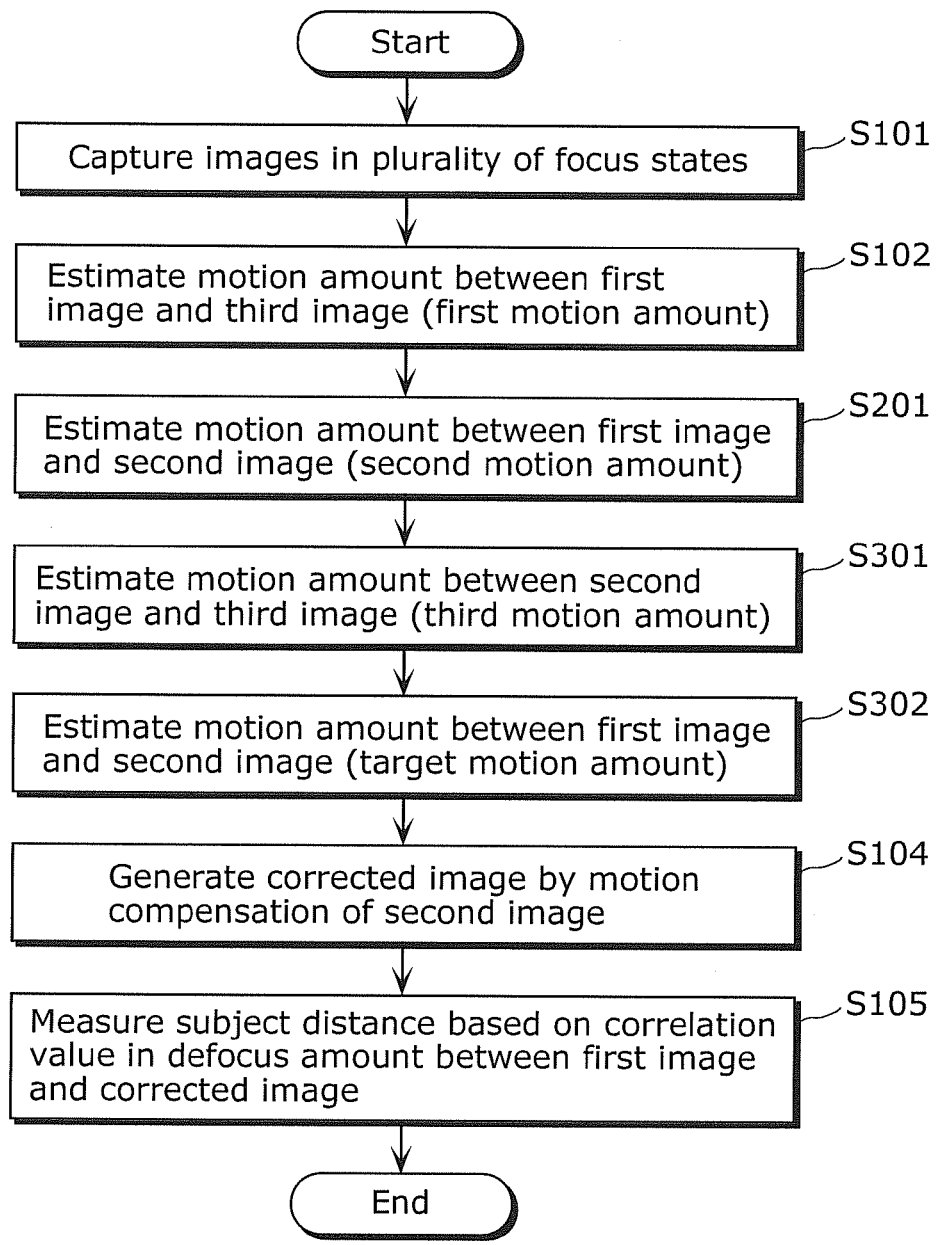
FIG. 10 is a flowchart illustrating an example of the flow of processing of an image processing method according to Embodiment 3 of the present invention.
Figure 11:
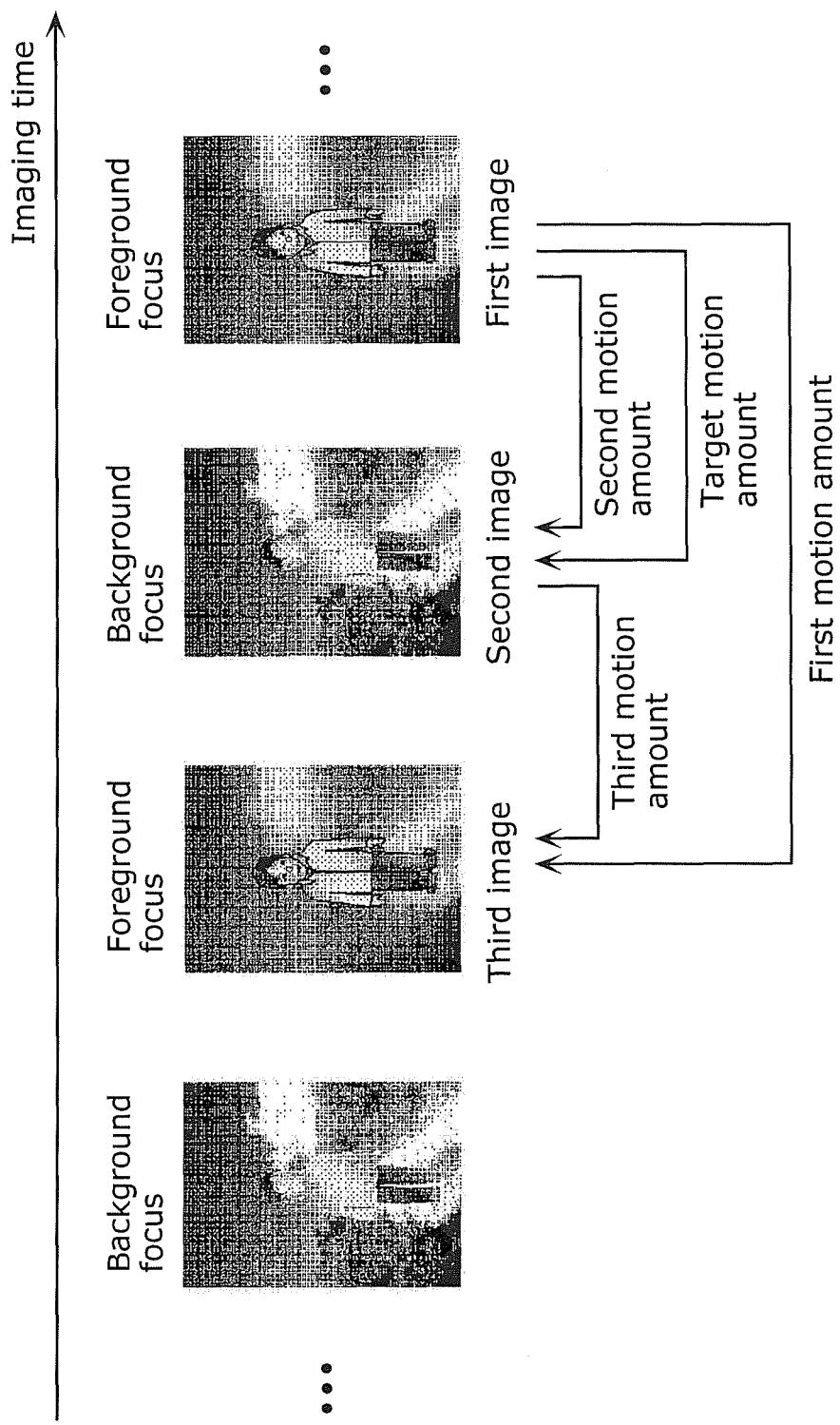
FIG. 11 is a diagram illustrating the relationship of a plurality of captured images, a target motion amount, a first motion amount, a second motion amount, and a third motion amount according to Embodiment 3 of the present invention.
Figure 12:
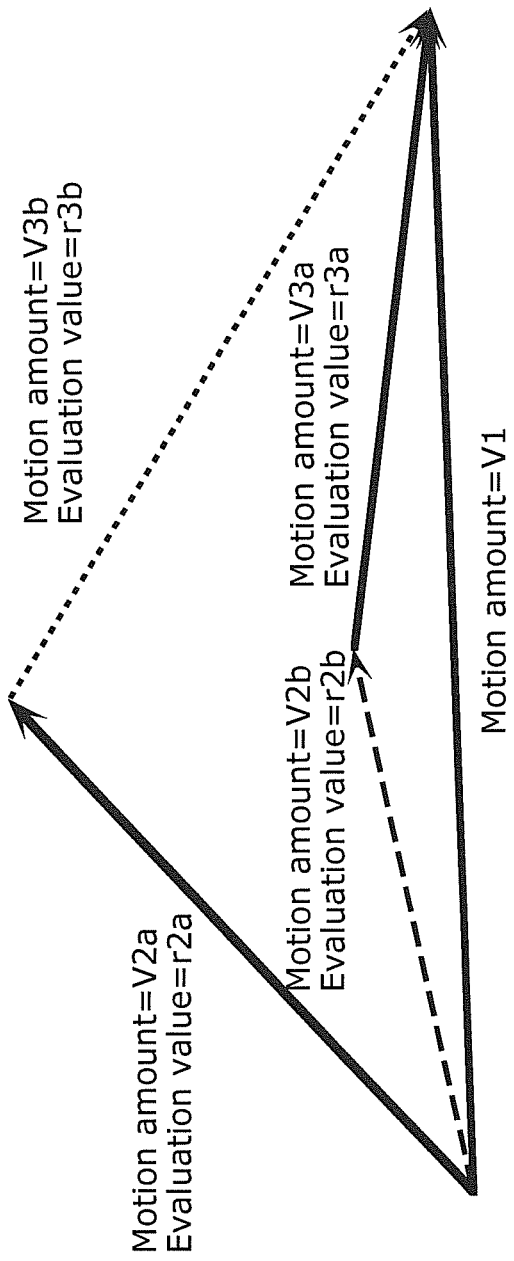
FIG. 12 is a vector diagram illustrating the relationship of estimated motion amounts among three captured images according to Embodiment 3 of the present invention.

Next, the flow of processing performed by the image processing apparatus according to Embodiment 3 of the present invention when measuring the subject distance will be described with reference to FIGS. 10 to 12. FIG. 10 is a flowchart illustrating the processing procedure of the image processing method according to this embodiment, and FIG. 11 is a diagram illustrating the relationship of captured images, the target motion amount, the first motion amount, the second motion amount, and the third motion amount according to this embodiment. FIG. 12 is a vector diagram illustrating the relationship of the first motion amount, the second motion amount, the third motion amount, and the target motion amount. Note that in the flow of processing illustrated in FIG. 10, processes that are common to those in the flows of processing according to Embodiments 1 and 2 illustrated respectively in FIGS. 3 and 7 are denoted by the same reference numerals, and a description thereof has been omitted.

First, the video camera 200 (imaging apparatus) illustrated in FIG. 19 captures images in a plurality of focus states and outputs the captured images to the image processing apparatus 100 (step S101).

When measuring the subject distance, as illustrated in FIG. 10, the image processing apparatus 100 first causes the first motion amount estimation unit 11A of the target motion amount estimation unit 10C to calculate a motion amount between the first image and the third image as a first motion amount (step S102). The processing so far is the same as in Embodiments 1 and 2.

Next, the image processing apparatus 100 causes the second motion amount estimation unit 11B of the target motion amount estimation unit 10C to estimate a second motion amount that is an initial estimated value for the motion amount between the first image and the second image (step S201). This processing is the same as in Embodiment 2.

Then, the image processing apparatus 100 causes the third motion amount estimation unit 11C of the target motion amount estimation unit 10C to estimate a third motion amount that is a motion amount between the second image and the third image (step S301). This estimation can be performed using the block matching method.

Then, the image processing apparatus 100 causes the motion amount determination unit 12C of the target motion amount estimation unit 10C to estimate a target motion amount based on the first motion amount, the second motion amount, and the third motion amount (step S302). Here, a method for determining the target motion amount by selecting a combination that is determined to have high estimation accuracy based on the relationship of the first motion amount, the second motion amount, and the third motion amount will be described with reference to FIG. 12.

In FIG. 12, the first motion amount obtained in step S102 is indicated by V1. The second motion amount obtained in step S201 is indicated by V2a, and an evaluation value acquired at this time is indicated by r2a. The third motion amount obtained in step S301 is indicated by V3a, and an evaluation value acquired at this time is indicated by r3a. Here, since V1, V2a, and V3a represent two-dimensional motion amounts in the images and are thus expressed as vector quantities as indicated by solid-line arrows in FIG. 12. Here, if the relation expressed by Formula 7 below holds true, the motion amounts V1, V2a, and V3a achieve motion consistency among the three images and thus are all determined to have high estimation accuracy. Accordingly, the second motion amount V2a is used as the target motion amount.

[Formula 7]

$$V1 = V2a + V3a \tag{7}$$

However, if the relation expressed by Formula 7 does not hold true, it means that at least one of the first motion amount V1, the second motion amount V2a, and the third motion amount V3a have low estimation accuracy. It is however noted that the first motion amount V1 is thought to have high estimation accuracy because it is the motion amount estimated between the images captured in the same focus state. The second motion amount V2a and the third motion amount V3a are, on the other hand, motion amounts estimated between the images captured in different focus states. Thus, in this case, either or both of the second motion amount V2a and the third motion amount V3a are considered to have low estimation accuracy.

Here, if it is assumed that the second motion amount V2a has high estimation accuracy, a motion amount obtained by adding the vector of the second motion amount V2a and the vector of the actual third motion amount has to match the first motion amount V1. Thus, a correction candidate amount V3b for the third motion amount can be calculated from Formula 8. This is indicated by the dotted line in FIG. 12.

[Formula 8]

$$V3b = V1 - V2a \tag{8}$$

On the other hand, if it is assumed that the third motion amount V3a has high estimation accuracy (the second motion amount V2a has low estimation accuracy), a motion amount obtained by adding the vector of the third motion amount V3a and the vector of the actual second motion amount has to match the first motion amount V1. Thus, a correction candidate amount V2b for the second motion amount can be calculated from Formula 9. This is indicated by the broken line in FIG. 12.

[Formula 9]

$$V2b = V1 - V3a \quad (9)$$

Here, r3b denotes the result obtained by cutting out a block of interest in the search source image (second image) and a block area in the search destination image (third image) and calculating an evaluation value based on Formula 6, the result corresponding to the correction candidate amount V3b for the third motion amount. Also, r2b denotes the result obtained by cutting out the block of interest in the search source image (first image) and a block area in the search destination image (second image) and calculating an evaluation value based on Formula 6, the result corresponding to the correction candidate amount V2b for the second motion amount.

At this time, in the case where it is assumed that the second motion amount V2a has high estimation accuracy, a total evaluation value for the combination of the second motion amount V2a and the correction candidate amount V3b for the third motion amount is (r2a+r3b). On the other hand, in the case where it is assumed that the third motion amount V3a has high estimation accuracy, a total evaluation value for the combination of the correction candidate amount V2b for the second motion amount and the third motion amount V3a is (r2b+r3a).

Here, because the smaller one of the total evaluation values (r2a+r3b) and (r2b+r3a) indicates higher motion-amount estimation accuracy, either the second motion amount V2a or the correction candidate amount V2b for the second motion amount that is included in the combination with a smaller total evaluation value is determined as the target motion amount. In other words, if the total evaluation value (r2a+r3b) is smaller, it is determined that the second motion amount V2a has higher estimation accuracy, and the second motion amount V2a is determined as the target motion amount. On the other hand, if the total evaluation value (r2b+r3a) is smaller, it is determined that the third motion amount V3a has higher estimation accuracy, and the correction candidate amount V2b for the second motion amount is determined as the target motion amount.

However, if both of the total evaluation values (r2a+r3b) and (r2b+r3a) are greater than a predetermined threshold value, it means that both of the combinations show low motion-amount estimation accuracy. Thus, in this case, a motion amount that is half the first motion amount V1 is determined as the target motion amount.

Upon receiving the target motion amount from the target motion amount estimation unit 10C, the corrected image generation unit 20 gives motion compensation to the second image based on the received target motion amount so as to generate a corrected image (step S104). This step S104 is the same as in Embodiments 1 and 2.

Upon receiving the corrected image from the corrected image generation unit 20, the subject distance measurement unit 30 measures the subject distance using DFD, based on a correlation value in out-of-focus amount between the first image and the corrected image (step S105). This step S105 is the same as in Embodiments 1 and 2.

According to the above-described method, the target motion amount can be determined by selecting a combination that is determined to have high estimation accuracy based on the relationship of the three motion amounts, namely, the first motion amount, the second motion amount, and the third motion amount. This enables more highly accurate estimation.

Embodiment 4

Now, an image processing apparatus according to Embodiment 4 of the present invention will be described with reference to FIGS. 13 to 15.

The image processing apparatus of this embodiment differs from the image processing apparatus 100 of Embodiments 1 to 3 in that the measurement of the subject distance is performed in consideration of the influence of blur that occurs for example when the movement of the subject or a change in the imaging direction is fast.

Like Embodiment 1, this embodiment takes the example of a case where the imaging apparatus is the video camera 200 illustrated in FIG. 19 and the imaging states are two focus states, namely, foreground focus and background focus.

Configuration of Image Processing Apparatus of Embodiment 4

First, the configuration of an image processing apparatus 100 according to Embodiment 4 will be described with reference to FIG. 13.

Figure 13:
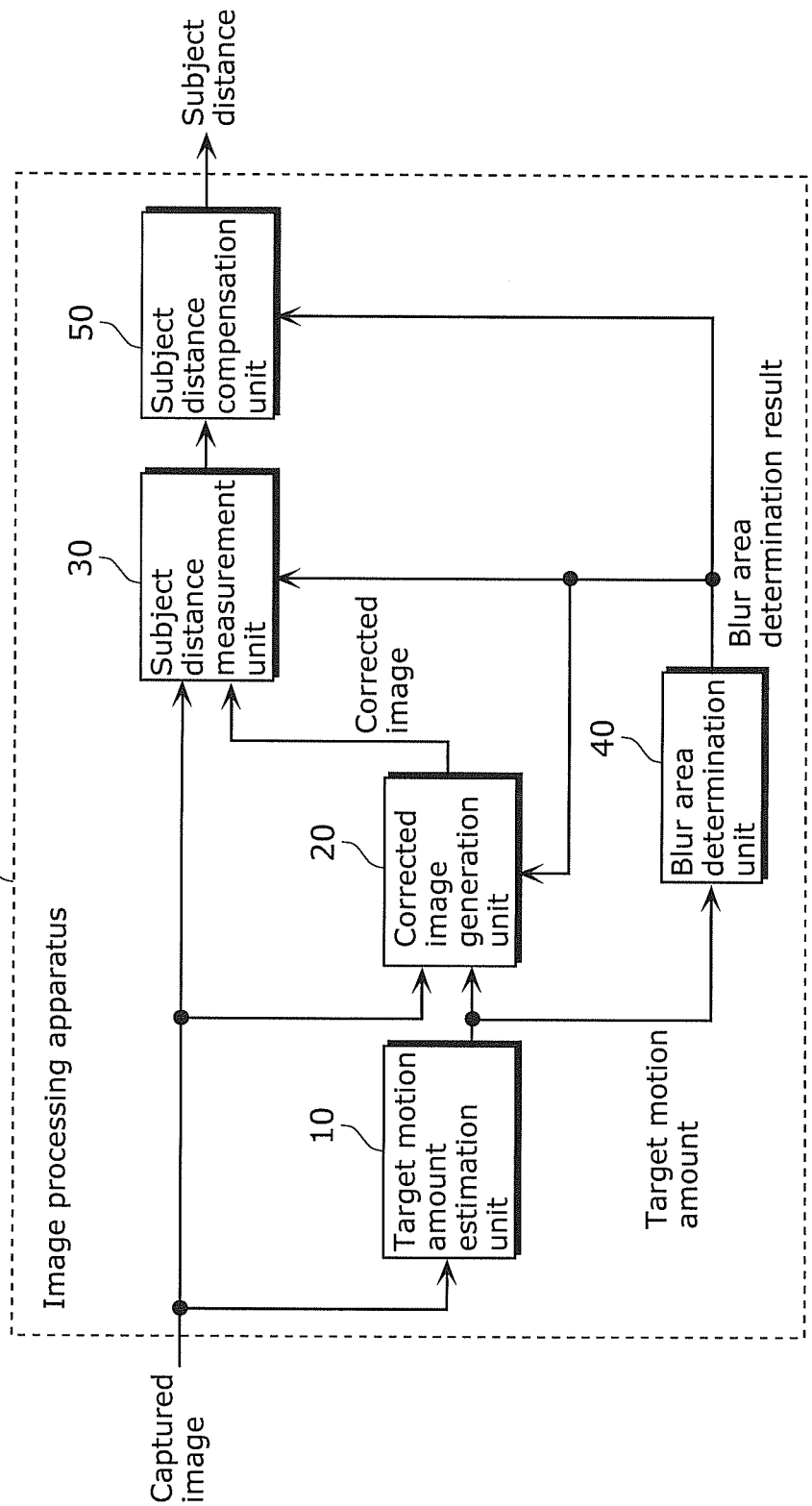
FIG. 13 is a block diagram illustrating an exemplary configuration of an image processing apparatus according to Embodiment 4 of the present invention.

FIG. 13 is a block diagram illustrating an exemplary configuration of an image processing apparatus 100. Note that in the configuration of the image processing apparatus according to this embodiment, blocks that are common to those in the image processing apparatus 100 according to any one of Embodiments 1, 2, and 3 are denoted by the same reference numerals, and a description thereof has been omitted.

As illustrated in FIG. 13, this image processing apparatus 100 includes a target motion amount estimation unit 10, a corrected image generation unit 20, a subject distance measurement unit 30, a blur area determination unit 40, and a subject distance compensation unit 50. Note that this embodiment takes the example of a case where the target motion amount estimation unit has the same configuration as the target motion amount estimation unit 10A of Embodiment 1, it may have the same configuration as the target motion amount estimation unit 10B of Embodiment 2 or the target motion amount estimation unit 10C of Embodiment 3.

As in the Embodiment 1, the image processing apparatus of this embodiment is configured to alternately and sequentially acquire background focused images captured in background focus and foreground focused image captured in foreground focus from the video camera 200. The following description is given on the assumption that a captured image for which the subject distance is to be calculated is a first image, the image captured immediately before the first image is a second image, and the image captured immediately before the second image is a third image.

The blur area determination unit 40 is configured to determine whether or not blur has occurred in the first and second images based on the target motion amount that is output from the target motion amount estimation unit 10, and output a blur area determination result that includes information (i.e., position coordinates) indicating an area that has been determined to have blur, to the corrected image generation unit 20, the subject distance measurement unit 30, and the subject distance compensation unit 50.

The corrected image generation unit 20 is configured to give motion compensation to the second image based on the target motion amount that is output from the target motion amount estimation unit 10, generate a corrected image with no shift in the position of the subject from the first image, and output the corrected image to the subject distance measurement unit 30. In this embodiment, it should be noted that the corrected image is generated for only an area that has been determined to have no blur (hereinafter, referred to as a "non-blur area") from the blur area determination result output from the blur area determination unit 40.

The subject distance measurement unit 30 is configured to, as in Embodiments 1 to 3, measure the subject distance using DFD, based on a correlation value in out-of-focus amount between the first image and the corrected image. In this embodiment, it should be noted that the measurement of the subject distance is performed for only an area that has been determined as a non-blur area from the blur area determination result.

The subject distance compensation unit 50 is configured to estimate a subject distance for an area that has been determined to have blur (hereinafter, referred to as a "blur area") from the blur area determination result.

Processing Procedure of Image Processing Method of Embodiment 4

Next, the flow of processing performed by the image processing apparatus according to Embodiment 4 of the present invention when measuring a subject distance will be described with reference to FIGS. 14 and 15. FIG. 14 is a flowchart illustrating the processing procedure of the image processing method according to this embodiment, and FIG. 15 is a diagram illustrating the method for determining a blur area. Note that in the flow of processing illustrated in FIG. 14, processes that are common to those in the flows of processing according to Embodiments 1, 2, and 3 illustrated respectively in FIGS. 3, 7, and 10 are denoted by the same reference numerals, and a description thereof has been omitted.

First, the video camera 200 (imaging apparatus) illustrated in FIG. 19 captures images in a plurality of focus states and outputs the captured images to the image processing apparatus 100 (step S101). This processing is the same as in Embodiments 1 to 3.

Figure 14:
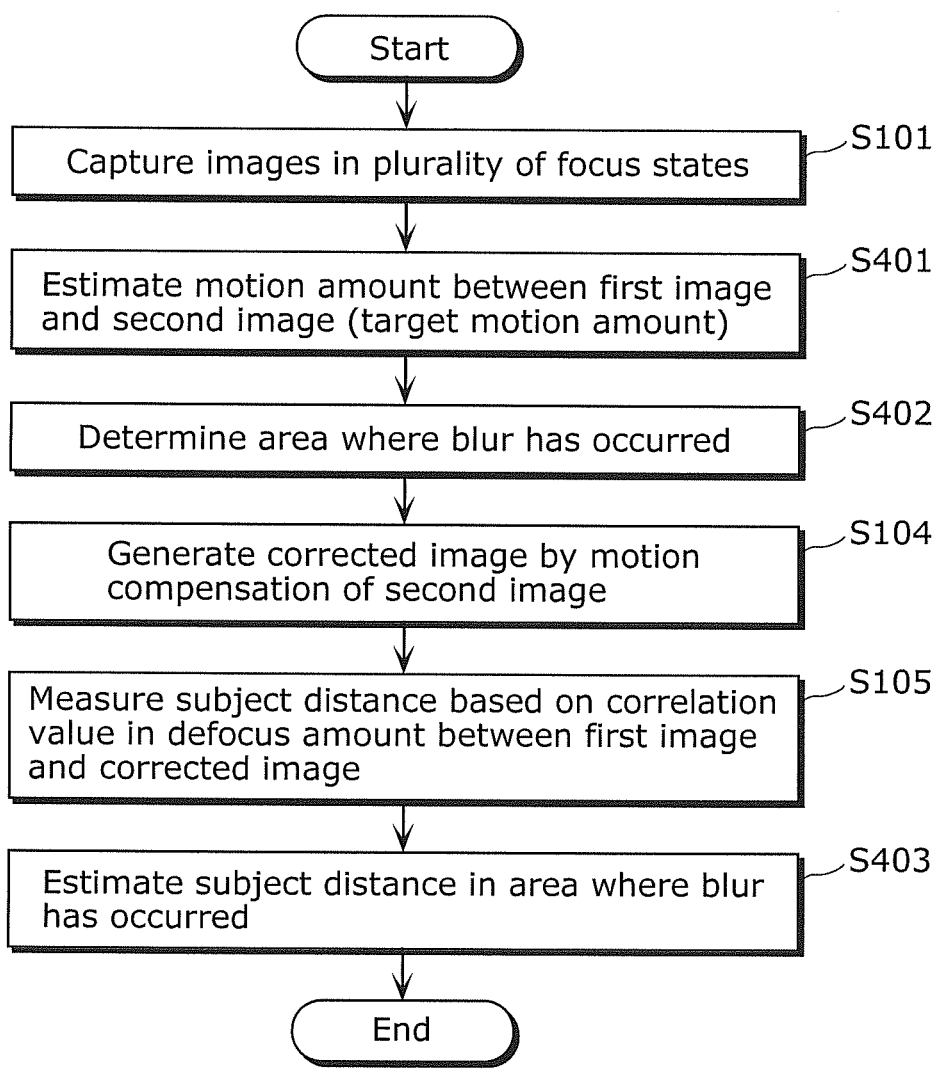
FIG. 14 is a flowchart illustrating an example of the flow of processing of an image processing method according to Embodiment 4 of the present invention.
Figure 15:
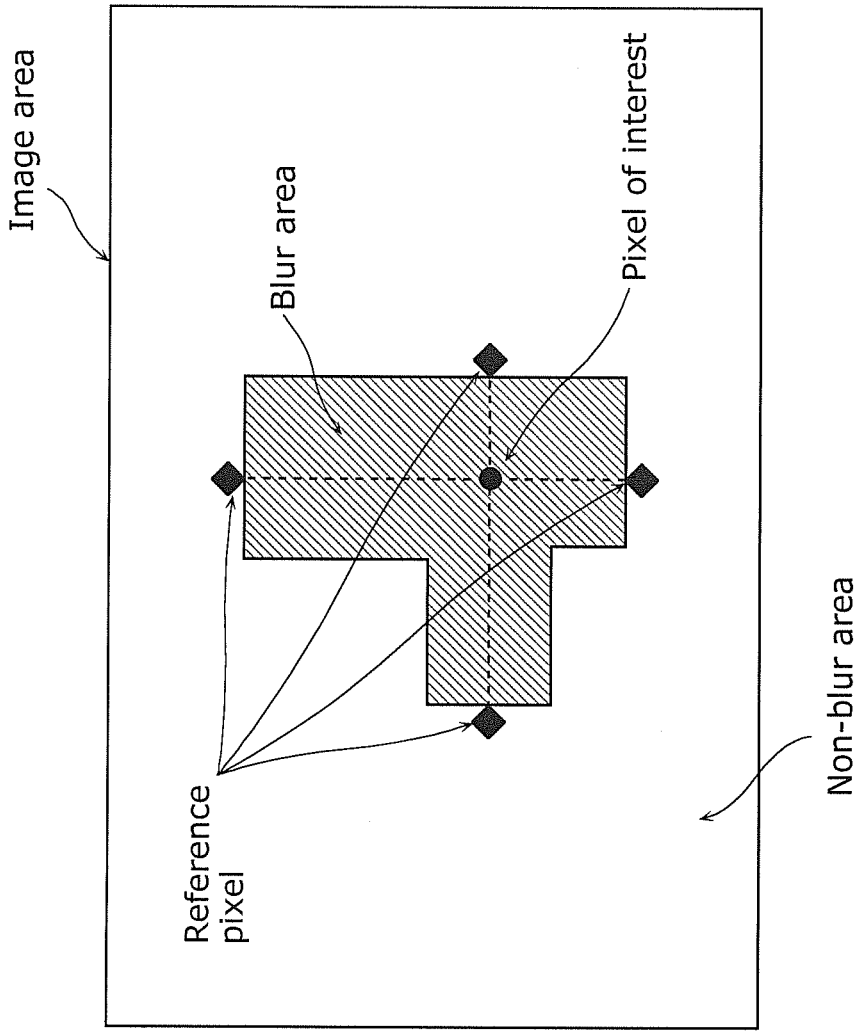
FIG. 15 is a diagram illustrating the relationship of pixel positions used in subject distance compensation processing according to Embodiment 4 of the present invention.

When measuring the subject distance, as illustrated in FIG. 14, the image processing apparatus 100 first causes the target motion amount estimation unit 10 to estimate a target motion amount between the first image and the second image (step S401). In this embodiment, this processing is the same as in steps S102 and S103 of Embodiment 1 (see FIG. 3). Note that the processing for estimating the target motion amount in step S401 may be the processing shown in steps S102, S201, and S202 of Embodiment 2 (see FIG. 7) or the processing shown in steps S102, S201, S301, and S302 of Embodiment 3 (see FIG. 10).

Next, the image processing apparatus 100 causes the blur area determination unit 40 to determine an area where blur has occurred in at least either of the first image and the second image (step S402). Note that if different blurs have occurred between the first image and the second image, the all-range focused image S (u, v) differs between the two formulas, namely, Formulas 2 and 3. Thus, Formula 4 does not hold true and the subject distance cannot be measured based on Formula 5. On the other hand, if the same degree of blur has occurred between the first image and the second image, the two captured images that include the influence of the blur have a common all-range focused image S(u, v). Thus, theoretically, Formula 4 holds true and the subject distance can be measured based on Formula 5. However, if the captured images are greatly affected by blur, high frequency components of the captured images are lost considerably, and accordingly frequency information of the captured images that corresponds to the common all-range focused image S(u, v) includes only the remaining low frequency components that are not so much different between images captured in different focus states. Thus, in this case as well, it is considered difficult to measure the subject distance through DFD processing based on Formula 5.

Accordingly, in view of the above-described characteristic, if blur that is greater than or equal to a predetermined value has occurred at least one of the first image and the second image, it is determined that the subject distance cannot be measured with the method based on Formula 5, and a different method is used to measure the subject distance. The following description takes the example of a case where, for at least one of the first image and the second image, a target motion amount that is a motion amount between the first image and the second image is used to determine an area where blur that is greater than or equal to a predetermined threshold value has occurred. Originally, blur that occurs due to the movement of the subject or a change in the imaging direction during exposure time has nothing to do with a shift in the position of the subject between captured images. However, if the characteristic that if it is a short time, the movement of the subject and a change in the imaging direction occur with substantially constant velocity is used, it can be estimated that if a great degree of blur due to the movement of the subject or a change in the imaging direction has occurred during exposure time for capturing the first image and the second image, the target motion amount between the first image and the second image also increases.

From the above, if the target motion amount is greater than a predetermined threshold value, the blur area determination unit 40 determines based on this characteristics that blur greater than or equal to a predetermined magnitude has occurred in at least one of the first image and the second image. By performing this determination on the entire captured images (all the block areas that are set in the captured images), the blur area determination unit 40 obtains the blur area determination result obtained by determining whether each block area is a blur area or a non-blur area.

Upon receiving the target motion amount from the target motion amount estimation unit 10 and the blur area determination result from the blur area determination unit 40, the corrected image generation unit 20 gives motion compensation to the second image based on the received target motion amount and generates a corrected image (step S104). Note that in this embodiment, the corrected image generation unit 20 does not perform correction on block areas that have been determined as blur areas, and gives motion compensation to only block areas that have been determined as non-blur areas. The processing performed on block areas that have been determined as non-blur areas is the same as in Embodiments 1 to 3.

Upon receiving the corrected image from the corrected image generation unit 20 and the blur area determination result from the blur area determination unit 40, the subject distance measurement unit 30 measures the subject distance using DFD, based on a correlation value in out-of-focus amount between the first image and the corrected image (step S105). Note that in this embodiment, the subject distance measurement unit 30 does not perform the subject distance measurement using DFD on block areas that have been determined as blur areas, and performs the subject distance measurement using DFD on only block areas that have been determined as non-blur areas. The processing performed on block areas that have been determined as non-blur areas is the same as in Embodiments 1 to 3. Accordingly, for block areas that have been determined as blur areas, the subject distances have not yet been obtained at this time.

The subject distance compensation unit 50 performs subject distance compensation processing on block areas that have been determined as blur areas, and obtains the subject distances for all pixels that constitute the captured images (step S403).

Subject Distance Compensation Processing 1

Here, the subject distance for each pixel in a blur area is calculated by interpolation using subject distances in a non-blur area in the periphery of (adjacent to) the blur area. An overview of this processing will be described with reference to FIG. 15. In FIG. 15, in an image area that represents the entire captured image, an area that has been determined as a blur area is illustrated with diagonal lines, and an area that has been determined as a non-blur area is illustrated with a white background. Also, a pixel of interest for which the subject distance is to be generated by interpolation in the blur area is indicated by a round dot, and reference pixels whose subject distances are referenced during the compensation processing 1 in the non-blur area are indicated by diamond-shaped dots. In this embodiment, for the pixel of interest for which the subject distance is to be generated by interpolation in the blur area, the subject distance compensation unit 50 references the subject distances for reference pixels that are pixels located at positions that are obtained by drawing straight lines in both vertical and horizontal directions from the pixel of interest to the non-blur area. As can be seen from FIG. 15, the reference pixels are pixels in the non-blur area. Then, the subject distance for the pixel of interest is obtained by calculating an average value that is obtained by weighing the subject distances for the reference pixels in accordance with the inverses of the lengths of the straight lines that are drawn from the pixel of interest for which the subject distance is to be generated by interpolation to the reference pixels. The subject distance compensation unit 50 performs this processing while sequentially setting a pixel of interest and generates the subject distances for all the pixels in the blur area by interpolation.

According to the above-described method, it is possible to assign subject distances that are close to a peripheral area where no blur has occurred, to the blur area where blur has occurred. If such subject distance compensation processing has been performed, there is no concern that the subject distances assigned to the blur area are discontinuous to the peripheral area. Thus, for example, if the generated subject distances are used to generate a three-dimensional image, degradation in visual appearance of the image can be avoided.

Subject Distance Compensation Processing 2

As another example of the subject distance compensation processing performed by the subject distance compensation unit 50, there is processing for, for each pixel on which the compensation processing is to be performed, using subject distances for the second image that has been obtained previously and correcting these subject distances using the target motion amount.

Here, in the case of moving images, captured images are subjected to the measurement processing in the order captured. That is, measurement processing is performed on the second image before the measurement of the subject distances for the current first image. Specifically, the subject distances for the second image are measured based on a correlation value in out-of-focus amount between the second image and the corrected image that is obtained by performing motion compensation on the third image based on the target motion amount between the second image and the third image. Accordingly, the subject distances for the first image can be estimated by performing motion compensation on the subject distances for the second image that have been obtained by the subject distance measurement performed on the second image that is a past image, using the target motion amount that is a motion amount between the first image and the second image. In this way, the subject distances generated by performing motion compensation on the subject distances measured for the second image may be used for the blur area in the first image.

According to the above-described method, even for an area for which it is difficult due to the occurrence of blur to measure subject distances based on a correlation value in out-of-focus amount, it is possible to generate subject distances based on the measurement result of a past frame. Accordingly, highly accurate subject distances can be generated with stability.

Note that in both of the subject distance compensation processing 1 and the subject distance compensation processing 2 described above, the generation of the corrected image and the measurement of the subject distances based on the correlation value in out-of-focus amount may be performed on not only non-blur areas but also the entire image. In this case, redundant computations are included because subject distances that are not ultimately used are measured. However, in LSI (large scale integration) or the like, performing the generation of the corrected image and the measurement of the subject distances uniformly on the entire image based on the correlation value in out-of-focus amount may reduce delays rather than in the case of causing the processing to branch off in accordance with a specific condition, because this processing can be performed before the acquisition of the blur area determination result. In this case, a configuration is possible in which the generation of the corrected image and the measurement of the subject distances based on the correlation value in out-of-focus amount are performed for the entire image including the blur area, and then the subject distances for an area that has been determined as a blur area are overwritten with the subject distances generated by the subject distance compensation unit 50. Even with this configuration, the resultant subject distances are the same.

Embodiment 5

Now, an image processing apparatus according to Embodiment 5 of the present invention will be described with reference to FIGS. 16 to 18.

The image processing apparatus of this embodiment differs from the image processing apparatuses 100 of Embodiments 1 to 4 in that an HDR image is generated, instead of measuring subject distances.

The image processing apparatus of this embodiment is an apparatus for generating an HDR image from a plurality of captured images acquired in a plurality of imaging states, and for example, a case is described in which the image processing apparatus is provided in an imaging apparatus capable of capturing moving images (e.g., a surveillance camera). Thus, this embodiment takes the example of a case where the imaging states are two exposure states, namely, overexposure and underexposure.

As will be described later, the imaging apparatus of this embodiment is configured to alternately switch between overexposure (corresponding to a first imaging state in this embodiment) and underexposure (corresponding to a second imaging state in this embodiment) at predetermined time intervals during capture of moving images. The imaging apparatus of this embodiment is configured to alternately output overexposed images captured with overexposure and underexposed images captured with underexposure to the image processing apparatus of this embodiment. Note that while this embodiment takes the example of a case where the image processing apparatus of this embodiment is provided in the imaging apparatus, the image processing apparatus may be provided in other equipment that is capable of capturing moving images, or may be provided in other apparatuses that are capable of capturing images from the imaging apparatus.

Configuration of Image Processing Apparatus of Embodiment 5

First, the configuration of an image processing apparatus 300 according to Embodiment 5 will be described with reference to FIG. 16. FIG. 16 is a block diagram illustrating an exemplary configuration of the image processing apparatus 300. Note that in the configuration of the image processing apparatus according to this embodiment, blocks that are common to those of the image processing apparatus 100 according to Embodiment 1 are denoted by the same reference numerals, and a description thereof has been omitted.

Figure 16:
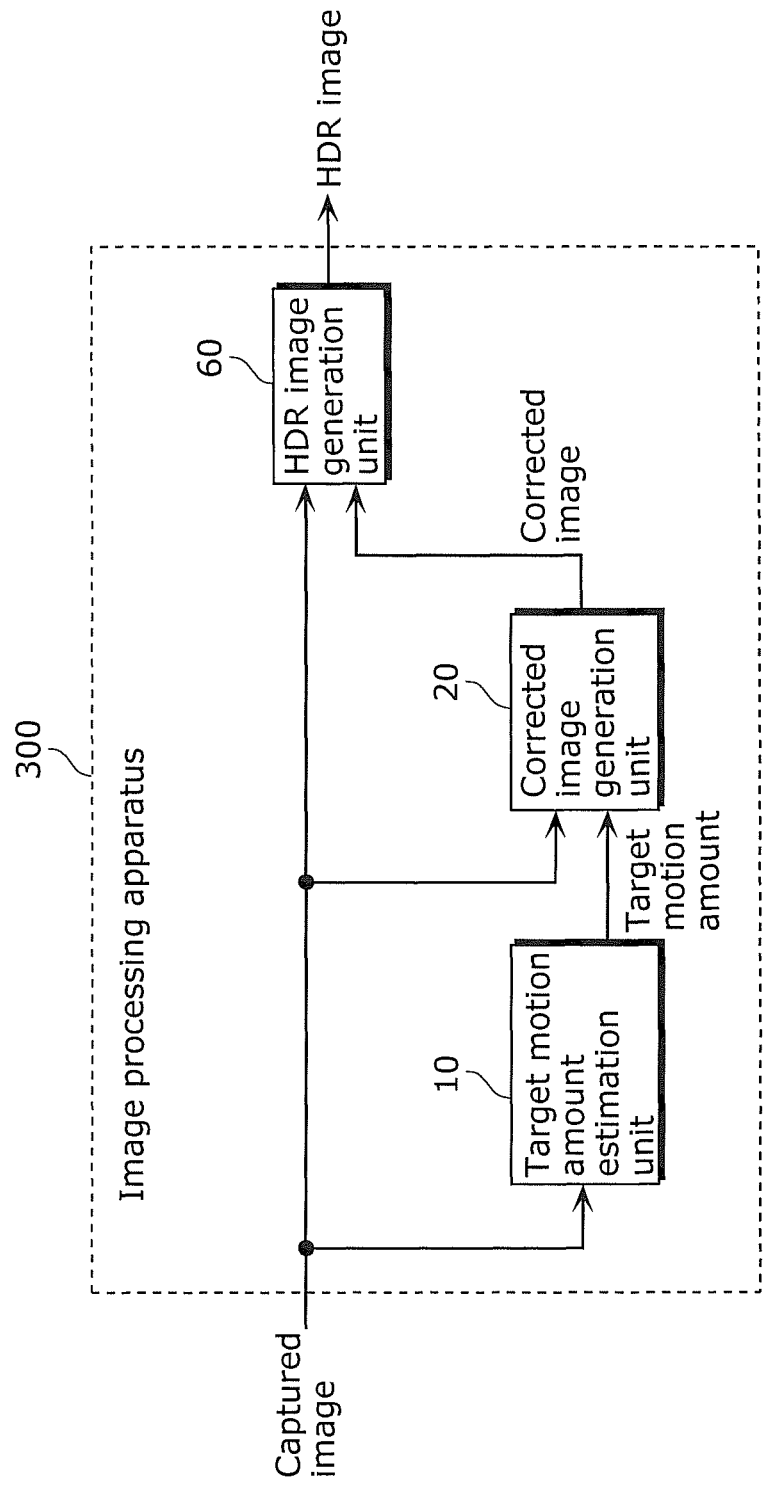
FIG. 16 is a block diagram illustrating an exemplary configuration of an image processing apparatus according to Embodiment 5 of the present invention.

The image processing apparatus 300 is an image processing apparatus that composites captured images acquired with overexposure and underexposure so as to generate an HDR image, and includes a target motion amount estimation unit 10, a corrected image generation unit 20, and an HDR image generation unit 60 as illustrated in FIG. 16. Note that the following description takes the example of a case where the configurations of the target motion amount estimation unit 10 and the corrected image generation unit 20 are the same as in Embodiment 1, these configurations may be the same as in Embodiment 2 or Embodiment 3.

The image processing apparatus 300 is configured to alternately and sequentially acquire overexposed images captured with overexposure and underexposed images captured with underexposure from the imaging apparatus. The following description is given on the assumption that, among two overexposed images and one underexposed image that are used to generate an HDR image, an overexposed image is a first image, the underexposed image captured immediately before the first image is a second image, and the overexposed image captured immediately before the second image is a third image. The first image and the third image are in the same exposure state. Note that although the following description takes the example of a case where a predetermined overexposed image is the first image, even if an underexposed image is used as the first image, an HDR image can also be generated in the same manner.

The target motion amount estimation unit 10 is configured to, as in Embodiments 1 to 4, estimate the amount of shift in the position of the subject between the first image (in this embodiment, overexposed image) and the second image (in this embodiment, underexposed image) as a target motion amount and output the target motion amount to the corrected image generation unit 20.

The corrected image generation unit 20 is configured to, as in Embodiments 1 to 4, give motion compensation to the second image based on the target motion amount, generate a corrected image with no shift in the position of the subject from the first image, and output the corrected image to the subject distance measurement unit 30.

The HDR image generation unit 60 is configured to composite the first image and the corrected image into an HDR image.

Processing Procedure of Image Processing Method of Embodiment 5

Next, the flow of processing performed by the image processing apparatus according to Embodiment 5 of the present invention when measuring a subject distance (processing procedure of image processing method) will be described with reference to FIGS. 17 and 18. FIG. 17 is a flowchart illustrating the processing procedure of the image processing method according to this embodiment, and FIG. 18 is a diagram illustrating the relationship of captured images, the target motion amount, and the first motion amount according to this embodiment. Note that in the flow of processing illustrated in FIG. 17, processes that are common to those in the flows of processing of Embodiments 1, 2, 3, and 4 illustrated respectively in FIGS. 3, 7, 10, and 14 are denoted by the same reference numerals, and a description thereof has been omitted.

First, the video camera 200 (imaging apparatus) illustrated in FIG. 19 captures images in a plurality of exposure states and outputs the captured images to the image processing apparatus 100 (step S501).

Figure 18:
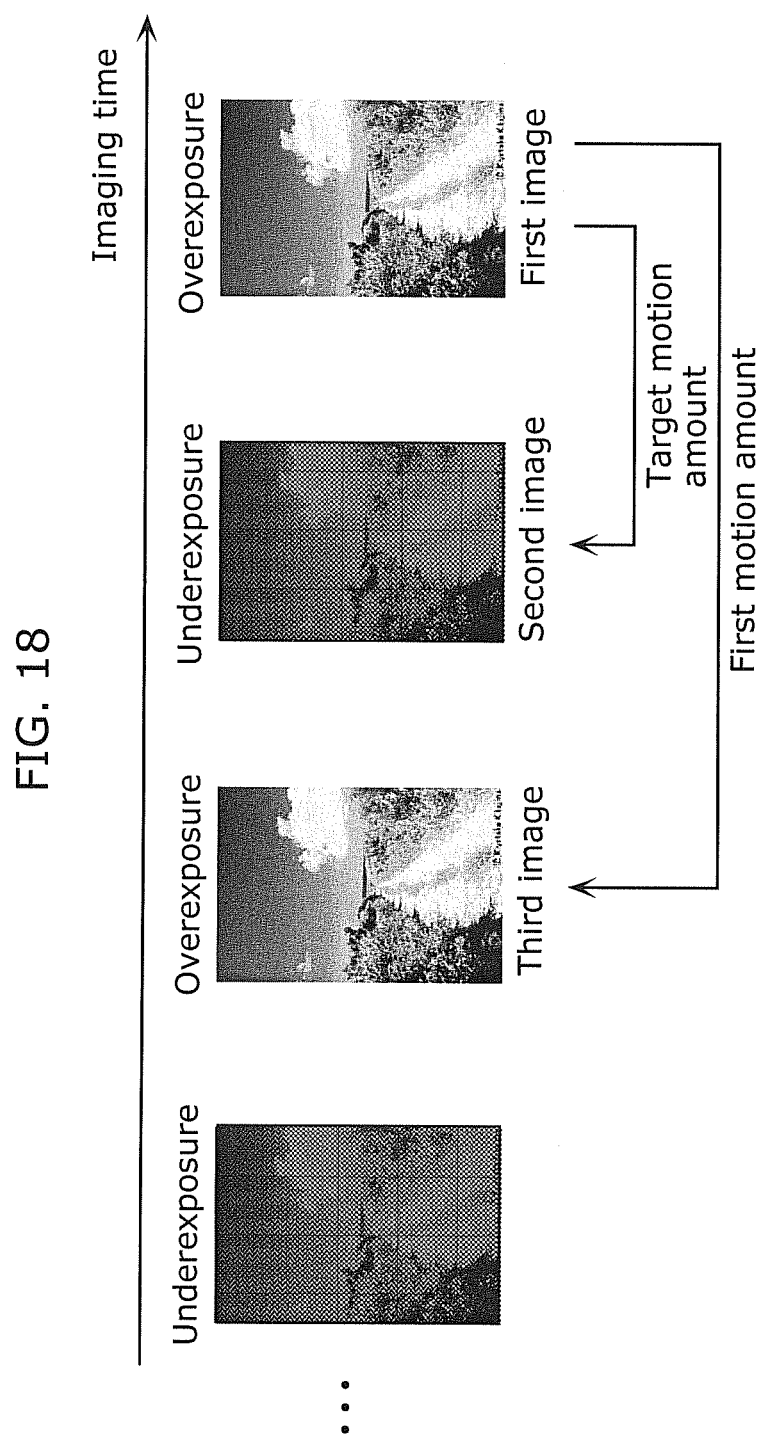
FIG. 18 is a diagram illustrating the relationship of a plurality of captured images, a target motion amount, and a first motion amount according to Embodiment 5 of the present invention.

The video camera 200 of this embodiment alternately and repeatedly perform imaging with overexposure and imaging with underexposure in succession as illustrated in FIG. 18, and outputs the captured overexposed and underexposed images to the image processing apparatus 100. Specifically, the switching between overexposure and underexposure is implemented by, for example, turning a light reducing filter on or off, switching the exposure time between long-term exposure and short-term exposure, or switching the aperture between open and closed states. Note that in the captured overexposed images, dark areas are reproduced but there is a blown-out highlight in bright areas, whereas in the captured underexposed images, blown-out highlight in bright areas can be suppressed, but dark areas are not reproduced.

As described above, it is assumed that one of the overexposed images captured with overexposure is a first image for which an HDR image is to be generated, the underexposed image captured with underexposure immediately before the first image is a second image, and the overexposed image captured with overexposure immediately before the second image is a third image. Note that although step S501 of this embodiment is not an absolute necessity in the present invention, it is described as a step that configures a more preferable form. It is sufficient for the image processing apparatus 100 to be configured to be capable of capturing images in a plurality of imaging states. The processing of steps S102 to S104 and S502 described below may be performed in parallel with imaging by the video camera 200, or may be executed after the imaging.

Figure 17:
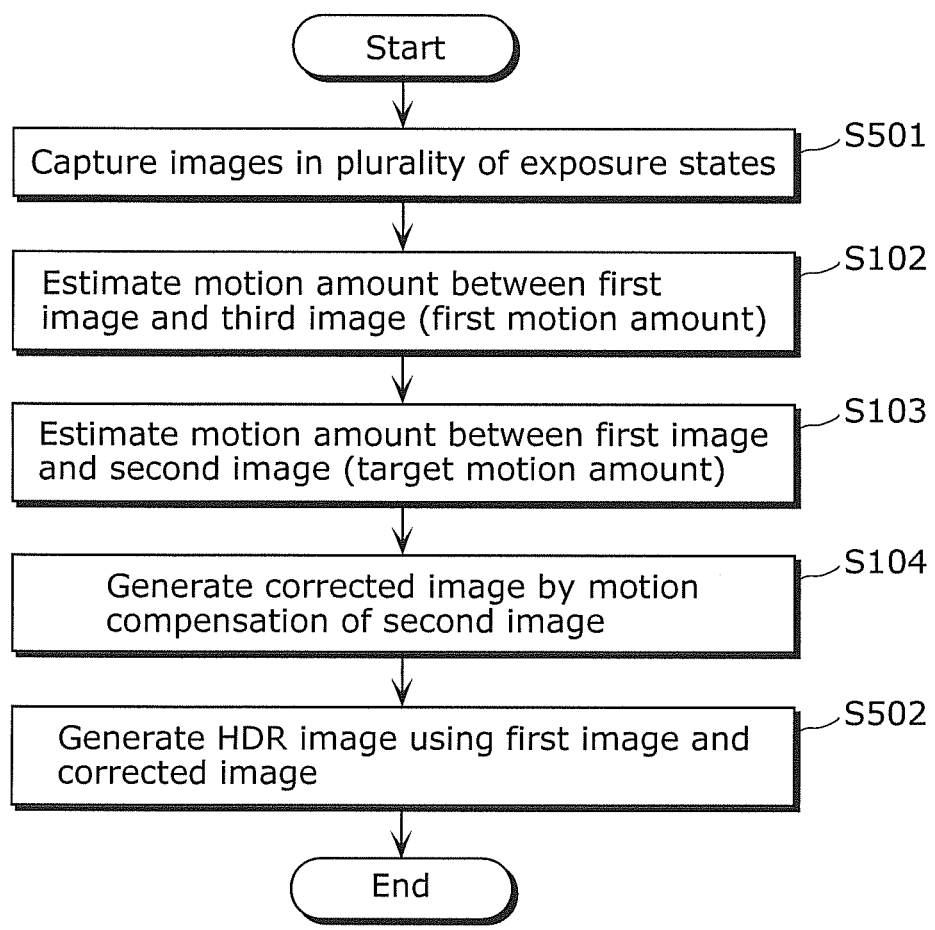
FIG. 17 is a flowchart illustrating the flow of processing according to Embodiment 5 of the present invention.

When generating an HDR image, as illustrated in FIG. 17, the image processing apparatus 100 first causes the target motion amount estimation unit 10 to obtain a first motion amount between the first image and the third image (step S102) and estimate a target motion amount between the first image and the second image, using the first motion amount (step S103). In this embodiment, this processing is the same as in Embodiment 1 (see FIG. 3). Note that instead of steps S102 and S103, steps S102, S201, and S202 in Embodiment 2 (see FIG. 7) or steps S102, S201, S301, and S302 in Embodiment 3 (see FIG. 10) may be executed.

Then, upon receiving the target motion amount from the target motion amount estimation unit 10, the corrected image generation unit 20 gives motion compensation to the second image based on the target motion amount and generates a corrected image (step S104). In this embodiment, this processing is the same as in Embodiment 1 (see FIG. 3).

Upon receiving the corrected image from the corrected image generation unit 20, the HDR image generation unit 60 composites the first image and the corrected image into a composite image with a wide dynamic range (step S502). A conventional technique can be used as the method for generating an HDR image. For example, an HDR image is generated by combining areas that have been captured with exposure close to correct exposure in the first image and the corrected image. Alternatively, each pixel in the corrected image may be obtained by, for example, adding up a value that is obtained by adding the pixel value of a pixel to be composited in the first image to a first weighing coefficient and a value that is obtained by adding the pixel value of a pixel to be composited in the corrected image to a second weighing coefficient. In this case, for example, the weighing coefficients for areas that have higher luminance than predetermined and areas that have lower luminance than predetermined may be set to low values, and the weighing coefficients for areas that have luminance close to a median value may be set to large values.

Note that, for example, if the exposure time is switched between long-term exposure and short-term exposure during capture of images (here, moving images) in step S501, blur may occur. In this case, a configuration may be adopted in which a blur area determination unit 40 is provided, and for an area that has been determined as a blur area, an image of that area is generated using an image of an area where no blur has occurred.

According to the above-described method, the first motion amount between the first image and the third image, which has been obtained with high accuracy by the block matching method, can be used to estimate the motion amount between the first image and the second image with high accuracy when an HDR image is generated using the first image and the second image captured in different exposure states.

If the switching between overexposure and underexposure is performed by turning a light reducing filter on and off, brightness (S/N ratio) differs between the first image and the second image. If the switching between overexposure and underexposure is performed by switching the exposure time, not only the brightness (S/N ratio) but also the amount of blur in an area where the subject moves differ between the first image and the second image. If the switching between overexposure and underexposure is performed by switching the aperture between open and closed states, not only the brightness (S/N ratio) but also the depth of field differ between the first image and the second image. In either case, since the brightness (S/N ratio), the amount of blur, and the depth of field are substantially the same between the first image and the third image, the first motion amount can be obtained with high accuracy.

The motion amount estimated with high accuracy can be used to prevent the occurrence of a position shift between the first image and the corrected image or reduce that shift to such an extent that a favorable HDR image can be generated. Thus, it is possible to more favorably generate an HDR image.

Variations (1) While in Embodiments 1 to 5 described above, the case of moving images has been described, the present invention is also applicable to the case of static images if three images, namely, a first image, a second image, and a third image, are captured. Note that in Embodiment 4, the subject distance compensation processing 1 can be used to apply the interpolation of the subject distance for each pixel in a blur area to static images.

(2) While in Embodiments 1 to 5 described above, the case has been described in which image processing is performed using two images captured in two imaging states, namely, the first image and the second image, a configuration is also possible in which image processing is performed using three or more images captured in three or more imaging states.

In the case of measuring a subject distance (in the case of Embodiments 1 to 4), for example, images are captured in a plurality of different levels of focus states between foreground focus (e.g., nearest distance) to background focus (e.g., infinite distance). In this case, it is assumed that two images captured in the same focus state are respectively the first image and the third image, and an arbitrary image captured between these two captured images is the second image.

Specifically, it is assumed, for example, that a single image captured in foreground focus is a first image, a single image captured in foreground focus next to the first image is a third image, and a plurality of images captured between the first image and the third image are second images.

Then, the target motion amount is obtained for each of the second images. In this case, as in the case where the imaging time intervals are not equal (see step S103 in Embodiment 1), the target motion amount used to generate an interpolated image can be obtained by correcting the magnitude of the first motion amount in accordance with the ratio of the imaging time intervals.

Furthermore, for each of the second images, a corrected image with no shift in the position of the subject from the first image is generated using the corresponding target motion amount. As a result, a plurality of second images with no position shift from the first image can be acquired. Lastly, the subject distances are measured using the first image and the corrected images.

This configuration enables more accurate measurement of the subject distances.

For example, in the case of generating an HDR image (in the case of Embodiment 5), images are captured at a plurality of levels of exposure states between overexposure and underexposure. In this case, it is assumed that two images captured in the same exposure state are respectively the first image and the third image, and an arbitrary image captured between the two captured images is the second image.

Specifically, it is assumed, for example, that a single overexposed image is the first image, a single overexposed image captured next to the first image is the third image, and a plurality of images captured between the first image and the third image are second images.

Then, the target motion amount is obtained for each of the second images. In this case, as in the case where the imaging time intervals are not equal (see step S103 in Embodiment 1), the target motion amount used to generate an interpolated image can be obtained by correcting the magnitude of the first motion amount in accordance with the ratio of the imaging time intervals.

Furthermore, for each of the second images, a corrected image with no shift in the position of the subject from the first image is generated using the corresponding target motion amount. As a result, a plurality of second images with no position shift from the first image can be acquired. Lastly, an HDR image is generated using the first image and the corrected images.

This configuration enables more accurate generation of an HDR image.

(3) Note that in the above-described embodiments, each functional block in the block diagrams (FIGS. 1, 2, 6, 9, 13, and 16) is typically realized as LSI that is an integrated circuit. These blocks may be individually embedded in a single chip, or some or all of them may be integrated into a single chip. The LSI as used here may also be referred to as an IC, a system LSI, a super LSI, or an ultra LSI depending on a difference in the level of integration.

The technique for achieving an integrated circuit is not limited to LSI technology, and it may be realized by a dedicated circuit or a general-purpose processor. It is also possible to use a field programmable gate array (FPGA) that can be programmed after the manufacture of LSI, or a reconfigurable processor that can reconfigure connections and settings of circuit cells in the LSI.

If another integrated circuit technology that replaces LSI technology comes along due to advancements in semiconductor technology or other spin-off technology, naturally such technology may be used for the integration of functional blocks. One possible example is the application of biotechnology.

In the above-described embodiments, each constituent element may be constituted by dedicated hardware, and constituent elements that can be implemented by software may be realized by executing a program.

While the above has been a description of embodiments of the present invention with reference to the drawings, the present invention is not intended to be limited to these embodiments. It should be noted that various kinds of modifications, additions, and changes can be made to the above-described embodiments within the same or equivalent scope of the present invention.

With the image processing apparatus and the image processing method according to the present invention, even if a shift in the position of a subject occurs between images using a plurality of images captured in a plurality of imaging states, the image processing can be performed with stability and high accuracy.

These configurations are useful in the fields of, for example, imaging apparatuses for both general and business use (digital still-video cameras or video cameras).

REFERENCE SIGNS LIST 10, 10A, 10B, 10C Target motion amount estimation unit
11A First motion amount estimation unit
11B Second motion amount estimation unit
11C Third motion amount estimation unit
12A, 12B, 12C Motion amount determination unit
20 Corrected image generation unit
30 Subject distance measurement unit
40 Blur area determination unit
50 Subject distance compensation unit
60 HDR image generation unit
100, 300 Image processing apparatus
200 Video camera

The invention claimed is:

1. An image processing apparatus for measuring subject distance using a plurality of captured images acquired by capturing a same subject in a plurality of focus states, the image processing apparatus comprising:
a non-transitory memory device storing a program; and
a hardware processor configured to execute the program and cause the image processing apparatus to operate as:
a target motion amount estimation unit configured to estimate a target motion amount that represents an amount of shift in a position of the subject between a first image and a second image among the captured images, the first image being captured in a first focus state, and the second image being captured in a second focus state different from the first focus state;
a corrected image generation unit configured to generate a corrected image by performing motion compensation on the second image based on the target motion amount; and
a subject distance measurement unit configured to measure a subject distance for the first image based on a correlation value in out-of-focus amount between the first image and the corrected image,
wherein the image processing apparatus receives the first image, the second image, and a third image, the second image being captured during a time interval between the first image and the third image, and the third image being captured in the first focus state at a time different from a time when the first image is captured, and
the target motion amount estimation unit includes:
a first motion amount estimation unit configured to estimate a first motion amount that represents an amount of shift in a position of the subject between the first image and the third image; and
a target motion amount determination unit configured to estimate the target motion amount using the first motion amount, and
wherein the target motion amount estimation unit further includes a second motion amount estimation unit configured to estimate a second motion amount that represents an amount of position shift between the first image and the second image,
the target motion amount determination unit is configured to estimate the target motion amount using the first motion amount and the second motion amount, and
the target motion amount determination unit is configured to determine accuracy of the second motion amount based on a difference in pixel value between a calculation target pixel that is included in the second image and for which the target motion amount is to be calculated among pixels that constitute the second image and a pixel that is included in the first image and corresponds to the calculation target pixel, and when it is determined that the accuracy of the second motion amount is higher than a threshold value, estimate the second motion amount as the target motion amount, and when it is determined that the accuracy of the second motion amount is lower than the threshold value, estimate the target motion amount using the first motion amount.

2. The image processing apparatus according to claim 1, wherein the target motion amount determination unit is configured to estimate the target motion amount by multiplying a magnitude of the first motion amount by a ratio of an imaging time interval between the first image and the third image to an imaging time interval between the first image and the second image to obtain a magnitude of the target motion amount.

3. The image processing apparatus according to claim 1, wherein the target motion amount estimation unit further includes a third motion amount estimation unit configured to estimate a third motion amount that represents an amount of position shift between the second image and the third image, and
the target motion amount determination unit is configured to estimate the target motion amount using the third motion amount in addition to the first motion amount and the second motion amount.

4. The image processing apparatus according to claim 3, wherein the target motion amount determination unit is configured to;
when a total of the second motion amount and the third motion amount is equal to the first motion amount, estimate the second motion amount as the target motion amount, and
when the total of the second motion amount and the third motion amount is not equal to the first motion amount, determine accuracy of the second motion amount based on a difference in pixel value between a pixel in the second image for which the target motion amount is to be calculated and a corresponding pixel in the first image, determine accuracy of the third motion amount based on a difference in pixel value between a pixel in the second image for which the target motion amount is to be calculated and a corresponding pixel in the third image, and when it is determined that the accuracy of the second motion amount is higher than the accuracy of the third motion amount, estimate the second motion amount as the target motion amount, and when it is determined that the accuracy of the second motion amount is lower than the accuracy of the third motion amount, estimate a motion amount that is obtained by subtracting the third motion amount from the first motion amount, as the target motion amount.

5. The image processing apparatus according to claim 1, further comprising:
   a blur area determination unit configured to determine an area where blur has occurred as a blur area based on the target motion amount; and
   a subject distance compensation unit configured to, for each pixel that constitutes the blur area, measure the subject distance for the first image using a subject distance for a non-blur area where the blur has not occurred in the first image, or a subject distance for another captured image for which the subject distance has been obtained in advance,
   wherein the subject distance measurement unit is configured to, for each pixel that constitutes the non-blur area, obtain the subject distance based on a correlation value in out-of-focus amount between the first image and the corrected image.

6. An image processing apparatus for performing image processing using a plurality of captured images acquired by capturing a same subject in a plurality of imaging states, the image processing apparatus comprising:
   a non-transitory memory device storing a program; and
   a hardware processor configured to execute the program and cause the image processing apparatus to operate as:
   a target motion amount estimation unit configured to estimate a target motion amount that represents an amount of shift in the position of the subject between a first image and a second image among the captured images, the first image being captured in a first imaging state, and the second image being captured in a second imaging state different from the first imaging state;
   a corrected image generation unit configured to generate a corrected image by performing motion compensation on the second image based on the target motion amount; and
   an image processing unit configured to perform image processing using the first image and the corrected image,
   wherein the image processing apparatus receives the first image, the second image, and a third image, the second image being captured during a time interval between the first image and the third image, and the third image being captured in the first focus state at a time different from a time when the first image is captured, and
   the target motion amount estimation unit includes:
   a first motion amount estimation unit configured to estimate a first motion amount that represents an amount of shift in a position of the subject between the first image and the third image; and
   a target motion amount determination unit configured to estimate the target motion amount using the first motion amount, and
   wherein the target motion amount estimation unit further includes a second motion amount estimation unit configured to estimate a second motion amount that represents an amount of position shift between the first image and the second image,
   the target motion amount determination unit is configured to estimate the target motion amount using the first motion amount and the second motion amount,
   the target motion amount determination unit is configured to determine accuracy of the second motion amount based on a difference in pixel value between a calculation target pixel that is included in the second image and for which the target motion amount is to be calculated among pixels that constitute the second image and a pixel that is included in the first image and corresponds to the calculation target pixel, and when it is determined that the accuracy of the second motion amount is higher than a threshold value, estimate the second motion amount as the target motion amount, and when it is determined that the accuracy of the second motion amount is lower than the threshold value, estimate the target motion amount using the first motion amount.

7. The image processing apparatus according to claim 6,
   wherein the image processing apparatus receives the first image captured in a first exposure state and the second image captured in a second exposure state, and
   the image processing unit is configured to perform the image processing that involves compositing the first image and the corrected image and generating a composite image with a wide dynamic range.

8. An image processing method of an image processing apparatus for measuring subject distance using a plurality of captured images acquired by capturing a same subject in a plurality of focus states, the image processing method comprising:
   estimating a target motion amount that represents an amount of shift in the position of the subject between a first image and a second image among the captured images, the first image being captured in a first focus state, and the second image being captured in a second focus state different from the first focus state;
   generating a corrected image by performing motion compensation on the second image based on the target motion amount; and
   measuring a subject distance for the first image based on a correlation value in out-of-focus amount between the first image and the corrected image,
   wherein the image processing method receives the first image, the second image, and a third image, the second image being captured during a time interval between the first image and the third image, and the third image being captured in the first focus state at a time different from a time when the first image is captured, and
   estimating the target motion amount includes:
   estimating a first motion amount that represents an amount of shift in a position of the subject between the first image and the third image; and
   estimating the target motion amount using the first motion amount, and
   wherein the image processing apparatus includes a non-transitory memory device storing a program, and a hardware processor configured to execute the program so as to perform the image processing method, and
   wherein the estimating of the target motion amount includes estimating a second motion amount that represents an amount of position shift between the first image and the second image, the determining of the target motion amount estimates the target motion amount using the first motion amount and the second motion amount, and the determining of the target motion amount determines accuracy of the second motion amount based on a difference in pixel value between a calculation target pixel that is included in the second image and for which the target motion amount is to be calculated among pixels that constitute the second image and a pixel that is included in the first image and corresponds to the calculation target pixel, and when it is determined that the accuracy of the second motion amount is higher than a threshold value, estimates the second motion amount as the target motion amount, and when it is determined that the accuracy of the second motion amount is lower than the threshold value, estimates the target motion amount using the first motion amount.

9. An image processing method for performing image processing using a plurality of captured images acquired by capturing the same subject in a plurality of imaging states, the image processing method comprising:

estimating a target motion amount that represents an amount of shift in the position of the subject between a first image and a second image among the captured images, the first image being captured in a first imaging state, and the second image being captured in a second imaging state different from the first imaging state;

generating a corrected image by performing motion compensation on the second image based on the target motion amount; and performing image processing using the first image and the corrected image, wherein the image processing method receives the first image, the second image, and a third image, the second image being captured during a time interval between the first image and the third image, and the third image being captured in the first focus state at a time different from a time when the first image is captured, and estimating the target motion amount includes:

estimating a first motion amount that represents an amount of shift in a position of the subject between the first image and the third image; and estimating the target motion amount using the first motion amount, and wherein the image processing apparatus includes a non-transitory memory device storing a program, and a hardware processor configured to execute the program so as to perform the image processing method, and wherein the estimating of the target motion amount includes estimating a second motion amount that represents an amount of position shift between the first image and the second image, and the determining of the target motion amount estimates the target motion amount using the first motion amount and the second motion amount, and the determining of the target motion amount determines accuracy of the second motion amount based on a difference in pixel value between a calculation target pixel that is included in the second image and for which the target motion amount is to be calculated among pixels that constitute the second image and a pixel that is included in the first image and corresponds to the calculation target pixel, and when it is determined that the accuracy of the second motion amount is higher than a threshold value, estimates the second motion amount as the target motion amount, and when it is determined that the accuracy of the second motion amount is lower than the threshold value, estimates the target motion amount using the first motion amount.

* * * * *